(12) United States Patent
Kraft

(10) Patent No.: US 10,421,137 B2
(45) Date of Patent: Sep. 24, 2019

(54) MULTIPLE TOOL

(71) Applicant: PASS Stanztechnik AG, Creußen (DE)

(72) Inventor: Stefan Kraft, Schnabelwaid (DE)

(73) Assignee: PASS STANZTECHNIK AG, Creussen (DE)

( * ) Notice: Subject to any disclaimer, the term of this patent is extended or adjusted under 35 U.S.C. 154(b) by 165 days.

(21) Appl. No.: 15/502,810

(22) PCT Filed: Aug. 4, 2015

(86) PCT No.: PCT/EP2015/067940
§ 371 (c)(1),
(2) Date: Feb. 9, 2017

(87) PCT Pub. No.: WO2016/023794
PCT Pub. Date: Feb. 18, 2016

(65) Prior Publication Data
US 2017/0239739 A1    Aug. 24, 2017

(30) Foreign Application Priority Data

Aug. 12, 2014 (DE) .................. 10 2014 215 951
Nov. 26, 2014 (DE) .................. 10 2014 224 094

(51) Int. Cl.
*B23G 3/00* (2006.01)
*B21D 28/12* (2006.01)

(52) U.S. Cl.
CPC ........... *B23G 3/005* (2013.01); *B21D 28/125* (2013.01); *Y10T 279/23* (2015.01); *Y10T 408/65* (2015.01)

(58) Field of Classification Search
CPC . B23G 3/005; Y10T 408/65; Y10T 408/6793; Y10T 408/68; B21D 28/12; B21D 28/125
USPC .............................. 29/26 R; 72/442; 279/128
See application file for complete search history.

(56) References Cited

U.S. PATENT DOCUMENTS

| | | | | |
|---|---|---|---|---|
| 1,475,828 A | * | 11/1923 | Holmes ................. | B21D 28/12 83/552 |
| 3,193,859 A | * | 7/1965 | Pfister .................... | B23G 3/005 408/124 |
| 3,788,760 A | * | 1/1974 | Daniels ................... | B23G 1/16 408/130 |
| 3,902,389 A | * | 9/1975 | Brown ................... | B21D 28/04 83/140 |

(Continued)

FOREIGN PATENT DOCUMENTS

| | | |
|---|---|---|
| DE | 202014001657 U1 | 3/2014 |
| EP | 2596878 A2 | 5/2013 |

(Continued)

*Primary Examiner* — Sunil K Singh
*Assistant Examiner* — Yasir A Diab
(74) *Attorney, Agent, or Firm* — Browdy and Neimark, PLLC

(57) ABSTRACT

A multiple tool for a punching device, in particular for a turret punch press has a housing and a tool head interacting with the punching device. A thread cutter magazine including a plurality of thread cutters is connected to the tool head. A selection device is provided to select an active thread cutter which interacts with a workpiece for thread cutting. A thread cutter drive device is provided to drive the active thread cutter. As a result, a multiple tool is obtained which expands the range of applications of a punching device.

12 Claims, 24 Drawing Sheets

(56) References Cited

U.S. PATENT DOCUMENTS

| | | | | |
|---|---|---|---|---|
| 4,092,888 A * | 6/1978 | Wilson | | B21D 28/34 |
| | | | | 83/140 |
| 4,977,804 A * | 12/1990 | Naito | | B21D 28/12 |
| | | | | 83/129 |
| 4,998,958 A * | 3/1991 | Chun | | B21D 28/12 |
| | | | | 83/133 |
| 5,001,827 A * | 3/1991 | Nakagawa | | B21D 28/12 |
| | | | | 29/560 |
| 5,048,385 A * | 9/1991 | Eckert | | B21D 28/12 |
| | | | | 83/34 |
| 5,062,337 A | 11/1991 | Johnson et al. | | |
| 5,615,471 A | 4/1997 | Perazzolo | | |
| 5,848,563 A * | 12/1998 | Saito | | B21D 28/12 |
| | | | | 83/552 |
| 2005/0271485 A1 * | 12/2005 | Kouno | | B21D 28/12 |
| | | | | 408/124 |
| 2007/0068352 A1 * | 3/2007 | Morgan | | B21D 28/34 |
| | | | | 83/140 |
| 2009/0188352 A1 * | 7/2009 | Huang | | B25B 23/0035 |
| | | | | 81/438 |
| 2009/0211326 A1 * | 8/2009 | Laib | | B21D 28/12 |
| | | | | 72/332 |
| 2010/0225075 A1 * | 9/2010 | Hecht | | B25B 23/0035 |
| | | | | 279/128 |
| 2010/0282034 A1 * | 11/2010 | Huang | | B25B 15/001 |
| | | | | 81/438 |
| 2011/0116881 A1 | 5/2011 | Sonoda et al. | | |
| 2012/0104702 A1 * | 5/2012 | Hu | | B25B 15/001 |
| | | | | 279/128 |
| 2013/0133497 A1 * | 5/2013 | Kraft | | B26D 7/00 |
| | | | | 83/571 |
| 2014/0015205 A1 * | 1/2014 | Viuf | | B25B 15/001 |
| | | | | 279/46.1 |

FOREIGN PATENT DOCUMENTS

| | | |
|---|---|---|
| GB | 190707916 | 7/1907 |
| JP | H02-133222 A | 5/1990 |
| JP | H02-303636 A | 12/1990 |
| JP | 09108942 A | 4/1997 |
| JP | 2002103140 A | 4/2002 |
| JP | 2003117621 A | 4/2003 |
| JP | 2010017797 A | 1/2010 |

\* cited by examiner

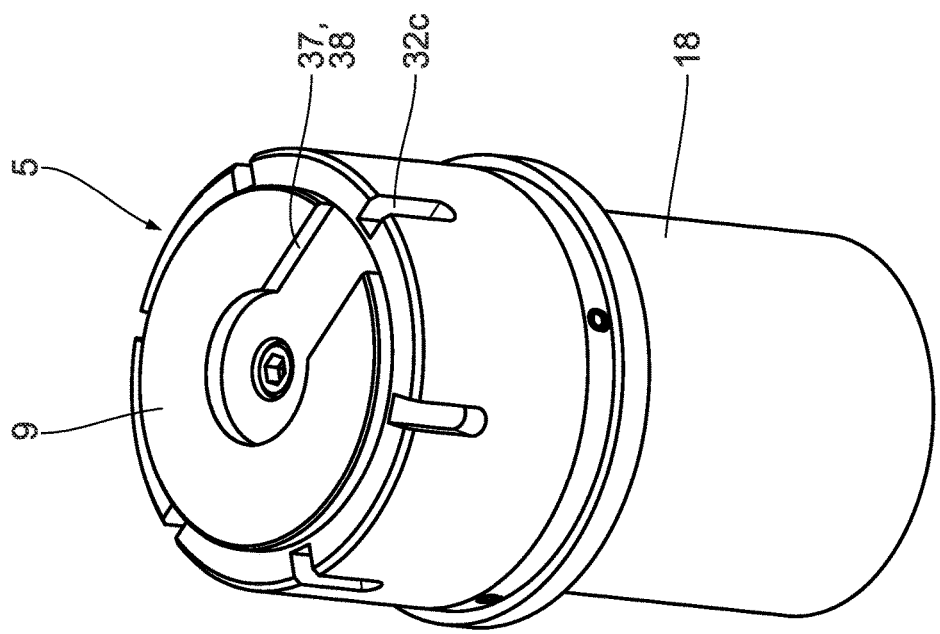
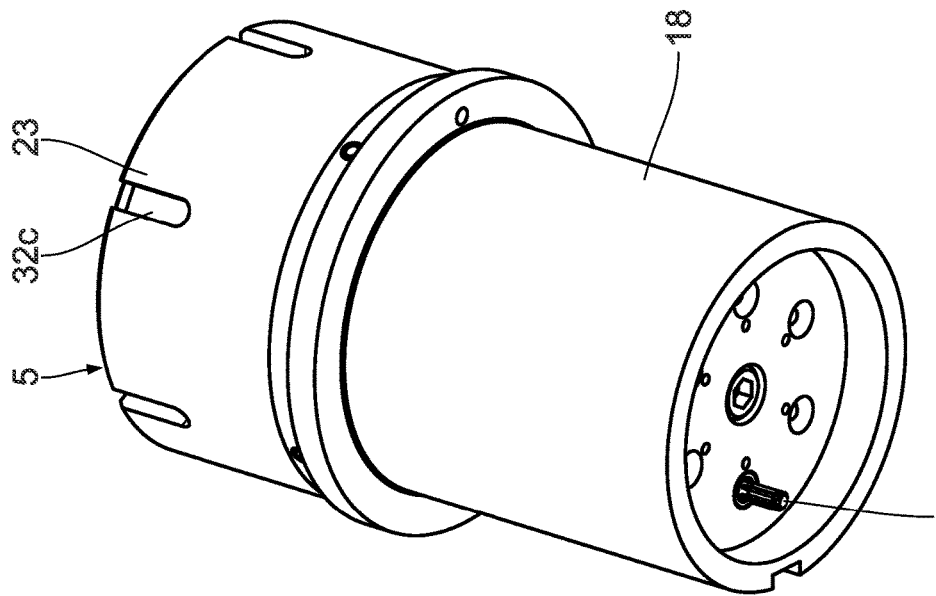

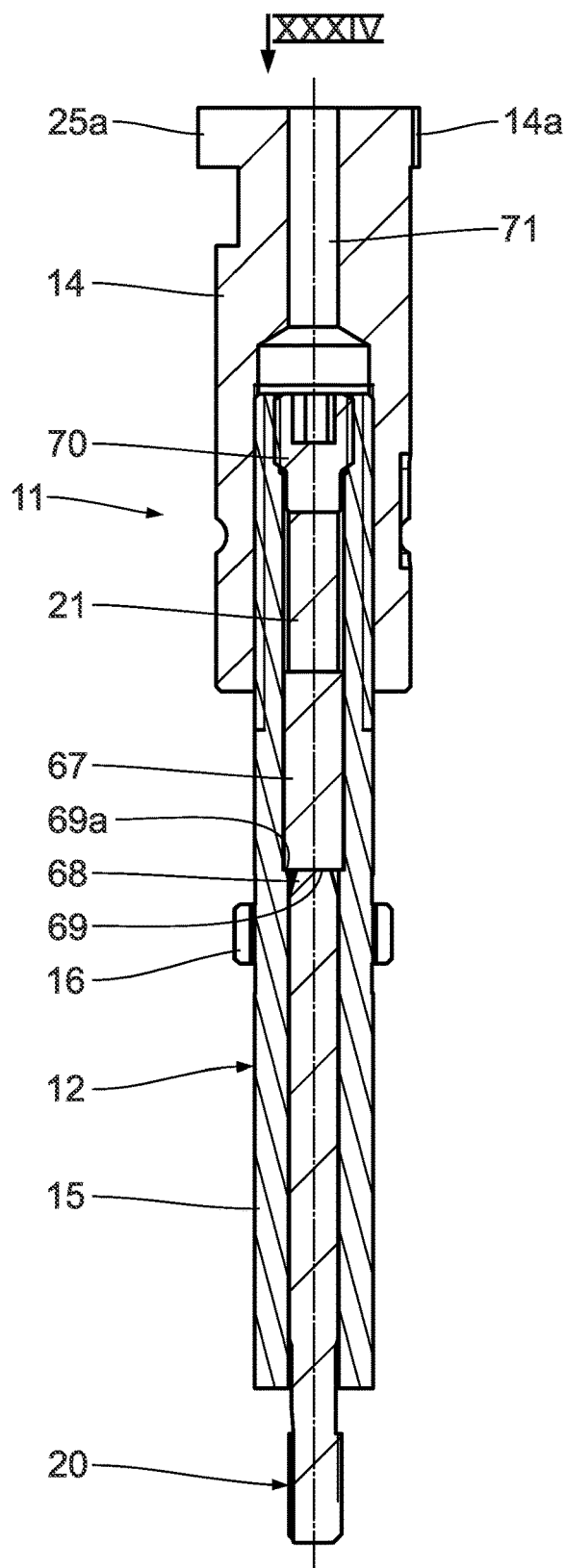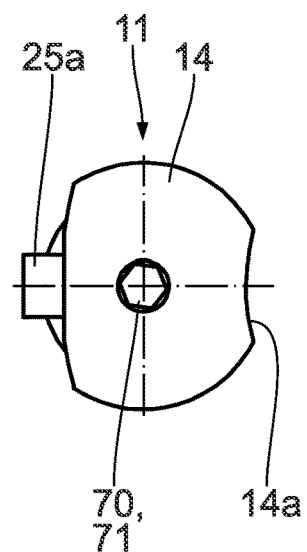
Fig. 33
Fig. 34

MULTIPLE TOOL

CROSS-REFERENCES TO RELATED APPLICATIONS

This application claims the priority of German Patent Application, Serial No. 10 2014 215 951.2, filed Aug. 12, 2014, and of German Patent Application, Serial No. DE 10 2014 224 094.8, filed Nov. 26, 2011, pursuant to 35 U.S.C. 119(a)-(d), the content of which is incorporated herein by reference in its entirety as if fully set forth herein.

FIELD OF THE INVENTION

The invention relates to a multiple tool for a punching device, in particular for a turret punch press.

BACKGROUND OF THE INVENTION

Multiple tools of this type are for instance known from EP 2 596 878 A, from U.S. Pat. No. 5,615,471, from JP 09-108942 A and from JP 2010-017797 A. Another tool is known from US 2011/0116881 A1. JP 2002/103140 A discloses a further multiple tool. A tool holder is known from DE 20 2014 001 657 U1.

SUMMARY OF THE INVENTION

An object of the present invention is to expand the range of applications of a punching device, in particular with a motorized and for example rotatable station.

This object is achieved according to the invention by a multiple tool for a punching device, in particular for a turret punch press, comprising
- a housing,
- a tool head interacting with the punching device,
- a thread cutter magazine comprising a plurality of thread cutters, the thread cutter magazine being connected to the tool head,
- a selection device for selecting an active thread cutter which interacts with a workpiece for thread cutting, and
- a thread cutter drive device for driving the active thread cutter, wherein the selection device has a guide device, which displaces the active thread cutter axially relative to the other thread cutters in the direction towards the workpiece.

It was found according to the invention that a multiple tool, which is adapted to a punching device, may be configured as a multiple thread-cutting tool. The plurality of thread cutters may be thread cutters for different thread diameters and/or thread cutters used sequentially for forming one and the same thread in a precise manner. Throughout this application, thread-forming tools are referred to as thread cutters as well. Using a punching device, which is already prepared for the use of multiple tools, usually multiple punching tools, the range of functions thereof can be expanded, by installing the multiple tool according to the invention, in such a way as to allow thread cutting or thread forming. The thread cutter drive device ensures an operationally safe function of the thread cutter that is active at a particular time.

The guide device as part of the selection device, the guide device displacing the active thread cutter axially relative to the other thread cutters in the direction towards the work piece ensures an operationally safe selection of the active thread cutter. Depending on the design of the selection device, the guide device may be configured as a component which is displaceable by means of the selection drive or as a component which is stationary during selection.

The individual thread cutters of the multiple tool may be configured as thread cutter units each composed of multiple parts. The multiple tool may have six thread cutters of this type. A different number, for instance 2, 3, 4, 5, 7, 8, 10 or even more thread cutters may be provided and selectable in a multiple tool.

The multiple tool may have a quickly removable tool head. To this end, the tool head may be connected to the remaining multiple tool via a fastening screw arranged centrally. The multiple tool may have a lubricating device, which allows in particular moved parts of the multiple tool, for instance the thread cutter that is active at a particular time, to be lubricated.

A selection device configured in such a way that a selection takes place by rotating an outer housing element in relation to another housing element is well adapted to the conditions in state-of-the-art punching devices designed for the use of multiple tools. An automated selection is possible. During selection, the thread cutter magazine may be pivoted about a housing longitudinal axis in relation to components of the selection device. When doing so, it is possible to perform an active pivoting movement of the thread cutter magazine and/or a component of the selection device. As long as the thread cutter magazine is not rotated during selection, each of the thread cutters remains in position as far as their position in the circumferential direction about the housing longitudinal axis is concerned. If the thread cutter magazine is rotated during selection, it can be ensured that the active thread cutter is provided in a circumferential position that is in each case the same when seen about the housing longitudinal axis. Depending on the drive and position requirements for the multiple tool, one of these alternatives may be advantageous.

A selection drive configured in such a way that a selection takes place by means of a selection drive allows the respective thread cutter to be selected in an automated manner.

A common drive, in which the thread cutter drive device is at the same time the selection drive, for thread cutting on the one hand and selection on the other simplifies the design of the multiple tool and of the drive connection with the punching device.

A drive device having a rotating component comprising a toothing which is actively connected to a thread cutting drive, the toothing interacting with an external toothing of the thread cutter allows the number of rotations during the operation of the active thread cutter to be set by means of a selectable gear ratio between the toothings, for instance between internal toothings and external toothings. Alternatively, a gear ratio may be defined by means of a transmission gearing, which may be provided in addition thereto. Alternatively, the drive device may also have a rotating drive core or a central drive shaft comprising an external toothing, the drive core being actively connected to the thread cutter drive device so that the external toothing of the drive core interacts with the external toothing of the thread cutter in such a way that a gear ratio is definable as explained above.

A design of the drive device, comprising a configuration of the drive device such that the toothing is actively connected to the external toothing both in an active position of the thread cutter that is active at that time and in a non-active position of the thread cutter that is non-active at that time, avoids a laborious decoupling and re-engagement of the drive device for the respective thread cutter that is active at a particular time. Furthermore, the toothing of this design ensures a guiding of, for instance, an axial movement of the thread cutter between the active and the non-active position.

The active thread cutter of the multiple tool may be arranged eccentrically in relation to a housing longitudinal axis. An eccentric arrangement of the active thread cutter of this type facilitates a displacement when selecting the respective thread cutter that is to be active at a particular time.

Positive fit bodies, wherein on its upper side facing an actuating ram, the tool head has a plurality of positive fit bodies displaceable in an actuating direction, the positive fit bodies being arranged and configured in such a way as to ensure a positive fit between the tool head and the actuating ram in an actuating position of the actuating ram, allow a secure transmission of forces between the actuating ram and the tool head. A particular arrangement and/or contour of the positive fit bodies ensures a positive fit between the actuating ram and the tool head in a plurality of predefined rotational positions of the actuating ram in relation to the tool head.

An embodiment, in which the positive fit bodies are configured as bolts which are resiliently biased counter to an actuating direction of the actuating ram, with at least one of the bolts being displaced counter to its bias in the actuating position of the actuating ram, allows an arrangement in which at least one spring bolt is displaced by the actuating ram in the actuating position in a direction counter to its spring bias. This may be used to monitor the functioning of the multiple tool while allowing the spring bolt configuration to be adapted to different edge contours of the actuating ram.

Pressure sensor contact surfaces, in which the tool head has at least one pressure sensor contact surface for interaction with a pressure sensor of the actuating ram, may interact with associated pressure sensors provided on the actuating ram. Pressure sensors of this type may be used to monitor the position of the actuating ram in the actuating position. As an alternative or in addition thereto, it is conceivable to use pressure sensors of this type to monitor a cutting force during thread cutting or thread forming by means of the multiple tool.

The advantages of a thread cutter unit for a multiple tool correspond to those already explained above with reference to the multiple tool.

Favourably, the thread cutter unit has a pin-shaped thread cutter for thread forming and a rotatably drivable insert sleeve with which the thread cutter is non-rotatably connected. Such thread cutter unit allows the thread cutter, which is exposed to a particular amount of wear, to be replaced, wherein the insert sleeve is reusable. Furthermore, the design of the thread cutter unit comprising an insert sleeve separate from the actual thread cutter allows an axial relative movement of the thread cutter relative to the insert sleeve, which may be useful to increase a service life of the thread cutter.

The insert sleeve may be configured of multiple parts. The insert sleeve may include a sleeve head, which is received in an insert holder of a thread cutter magazine. The sleeve head may be guided axially in the insert receptacle. The sleeve head may be mounted in the insert holder in such a way as to be secured against rotation. The sleeve head may further have a thread cutter lead spindle sleeve. Said thread cutter lead spindle sleeve may be screwed to the sleeve head of the insert sleeve.

It is advantageous when the thread cutter of the thread cutter unit is held in the insert sleeve by means of a magnet. A magnetic holder is particularly simple and allows the thread cutter to be replaced easily. A holding force of the magnet may be selected such that the thread cutter detaches from the insert sleeve when a predefined threshold force is exceeded. This may prevent damages to the thread cutter. The magnet may be configured as a permanent magnet. The magnet may generally also be configured as an electromagnet. The magnetic holder of the thread cutter in the insert sleeve may also be used independently of the details described above with reference to the multiple tool, in other words in particular independently of the type of selection device and of the type of the thread cutter drive device.

Preferably, the thread cutter of the thread cutter unit comprises a bias spring for mounting the thread cutter in the insert sleeve in an axially resilient manner. A bias spring may be used to reduce a wear of the thread cutter. Each thread cutter unit may have precisely one bias spring for mounting the thread cutter in the insert sleeve in an axially resilient manner. The bias spring may be configured as an elastomer block, in particular as a PU elastomer block.

Favourably, a set is provided consisting of a thread cutter lead spindle sleeve comprising an external toothing and a plurality of thread cutters which are insertable into the thread cutter lead spindle sleeve to produce a thread cutter unit. The advantages of a set correspond to those already explained above with reference to the multiple tool and the thread cutter unit.

The initially mentioned object is also solved according to the invention by a multiple tool for a punching device, in particular for a turret punch press, comprising
 a housing,
 a tool head interacting with the punching device,
 a thread cutter magazine comprising a plurality of thread cutters, the thread cutter magazine being connected to the tool head,
 a selection device for selecting an active thread cutter which interacts with a workpiece for thread cutting, and
 a thread cutter drive device for driving the active thread cutter,
 wherein the drive device has a rotating component comprising a toothing which is actively connected to a thread cutting drive, the toothing interacting with an external toothing of the thread cutter,
 wherein a configuration of the drive device is such that the toothing is actively connected to the external toothing both in an active position of the thread cutter that is active at that time and in a non-active position of the thread cutter that is non-active at that time.
 wherein each thread cutter unit comprises exactly one bias spring for mounting the thread cutter in the insert sleeve in an axially resilient manner.

The drive device allows the number of rotations during the operation of the active thread cutter to be set by means of a selectable gear ratio between the toothings, for instance between internal toothings and external toothings. Alternatively, a gear ratio may be defined by means of a transmission gearing, which may be provided in addition thereto. Alternatively, the drive device may also have a rotating drive core or a central drive shaft comprising an external toothing, the drive core being actively connected to the thread cutter drive device so that the external toothing of the drive core interacts with the external toothing of the thread cutter in such a way that a gear ratio is definable as explained above.

The claimed design of the drive device avoids a laborious decoupling and re-engagement of the drive device for the respective thread cutter that is active at a particular time. Furthermore, the toothing of this design ensures a guiding of a for instance axial movement of the thread cutter between the active and the non-active position.

A bias spring may be used to reduce a wear of the thread cutter. The bias spring can be configured as an elastomer block, in particular as a PU elastomer block.

An exemplary embodiment of the invention will hereinafter be explained in more detail by means of the drawing.

BRIEF DESCRIPTION OF THE DRAWING

FIGS. 3 and 4 show perspective views of the multiple tool;

FIG. 33 shows an axial longitudinal section through another embodiment of a thread cutter unit, which may be used instead of the embodiments of thread cutter units shown with reference to the embodiments of multiple tools according to FIGS. 9 and 20 as well as 26;

FIG. 34 shows a head view of the thread cutter unit according to FIG. 33, seen from viewing direction XXXIV in FIG. 33.

DESCRIPTION OF THE PREFERRED EMBODIMENT

Figure 1:
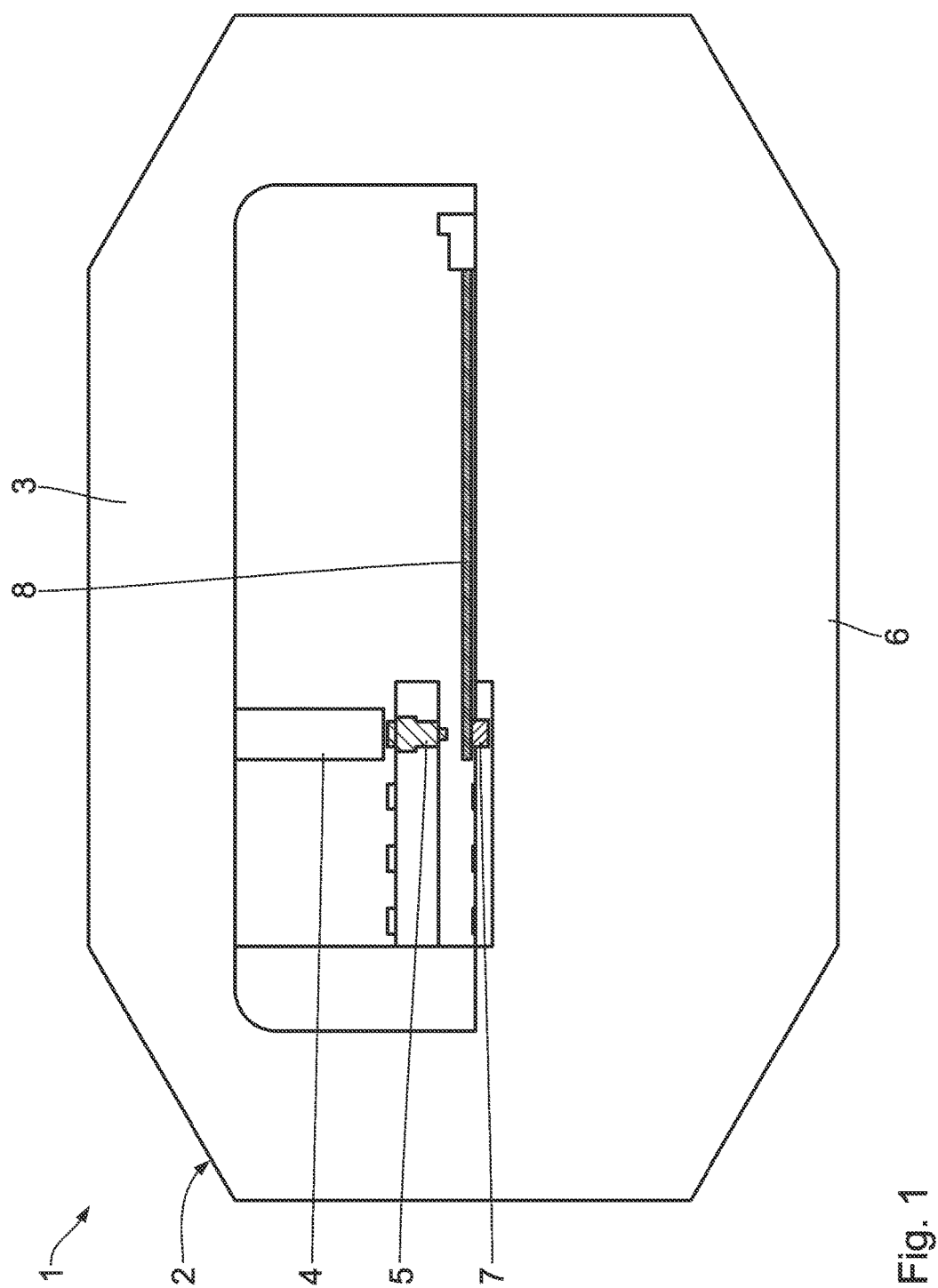
FIG. 1 shows a side view of a diagrammatic punching device comprising a multiple tool according to the invention.
Figure 2:
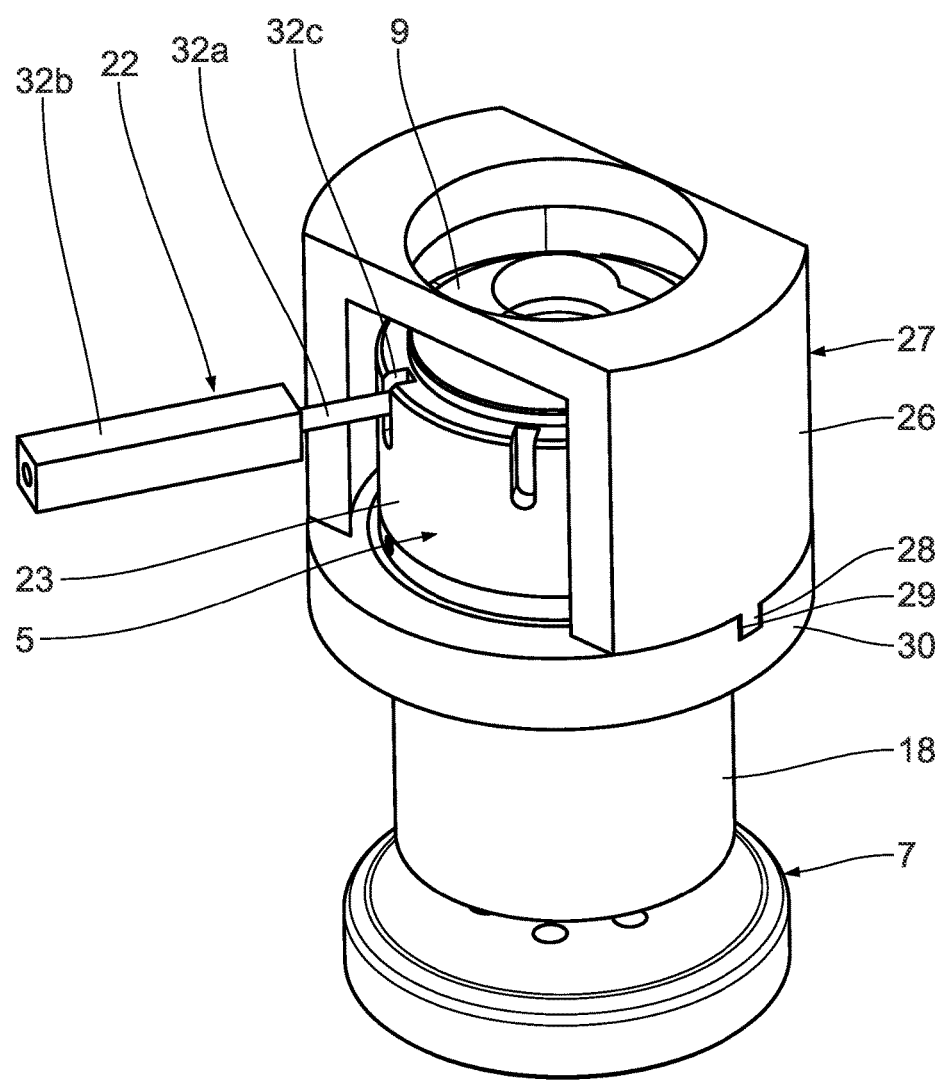
FIG. 2 shows a perspective view of the multiple tool with punching-device-end components of a tool selection device and a tool drive device.

A punching device 1, shown as a whole in FIG. 1, comprises a frame 2, with an actuating ram 4 being mounted to the upper frame part 3 thereof. Below the actuating ram 4, a multiple tool 5 is typically arranged in a turret. A workpiece counter holder 7 in the form of a die plate is located on the lower frame part 6 of the frame 2. A workpiece 8 to be machined is disposed between the multiple tool 5 and a workpiece counter holder 7, said workpiece 8 being a metal sheet in this particular case. During operation, a thread cutter of the multiple tool 5 is moved, by means of the actuating ram 4 and a drive device described below, through the workpiece in a rotating manner to produce a thread. The workpiece 8 may be a sheet metal panel.

Figure 9:
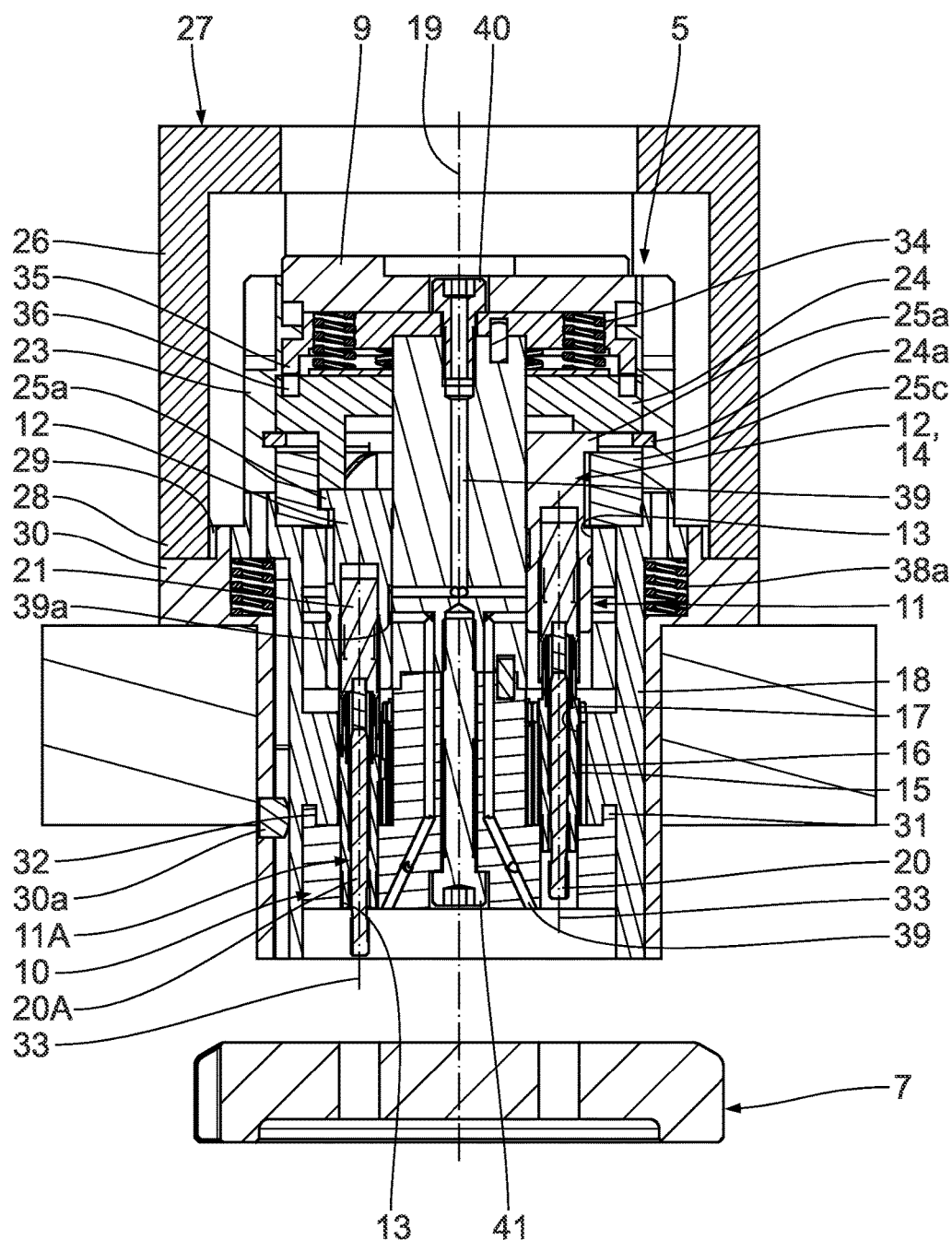
FIG. 9 shows a diagrammatic and partially broken longitudinal section through the multiple tool and a workpiece counter holder, with a thread cutter, as a tool of the multiple tool, being shown in an active position while another thread cutter is shown in a non-active position, with the multiple tool being shown in a selection position of the head-end components, said selection position allowing an active thread cutter to be selected from all thread cutters of the multiple tool by means of the tool selection device.
Figure 10:
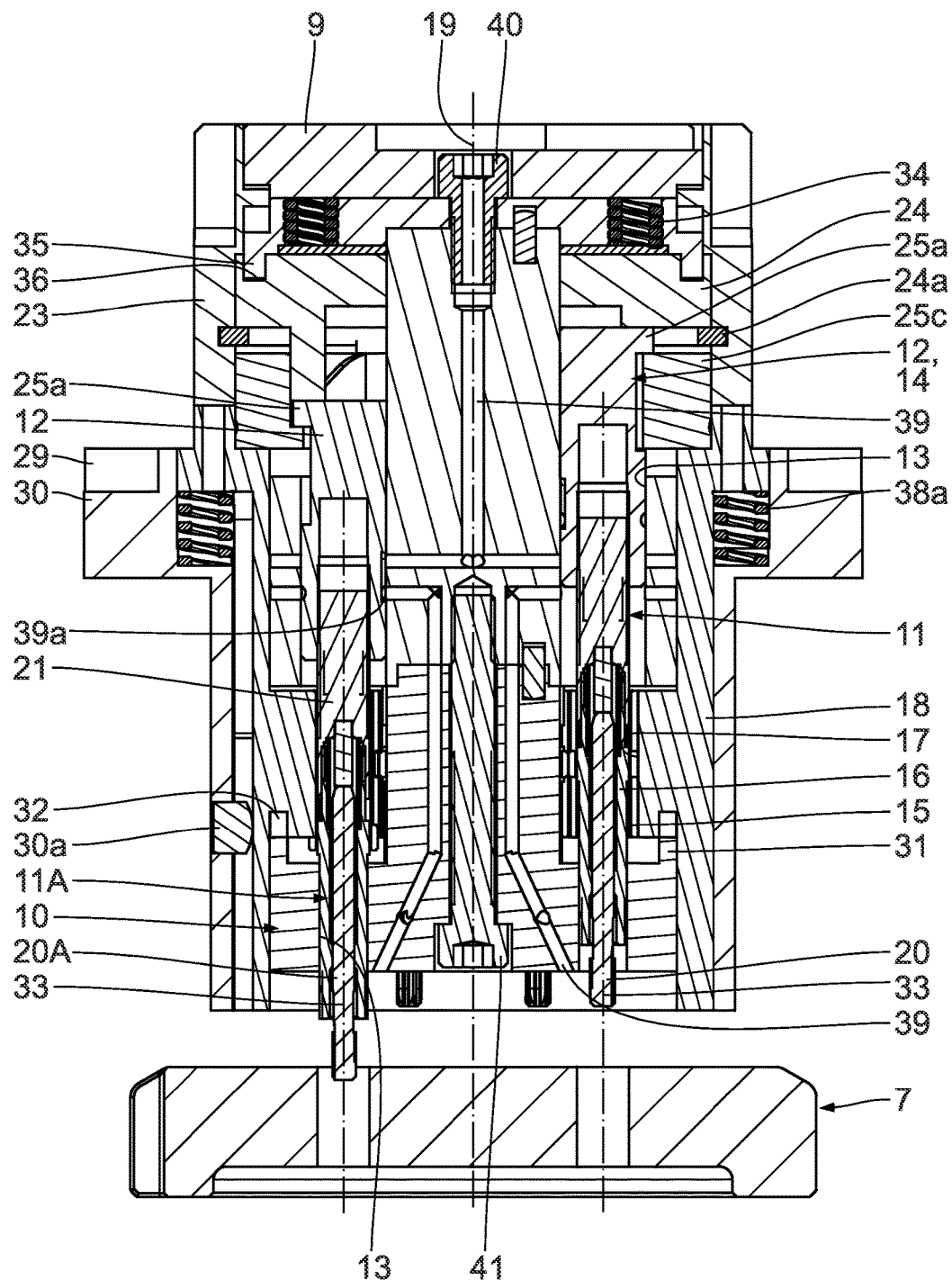
FIG. 10 shows a view, similar to FIG. 2, of the multiple tool and the workpiece counter holder, with the multiple tool being shown in a drive position in which the active thread cutter is drivable via the tool drive device.
Figure 11:
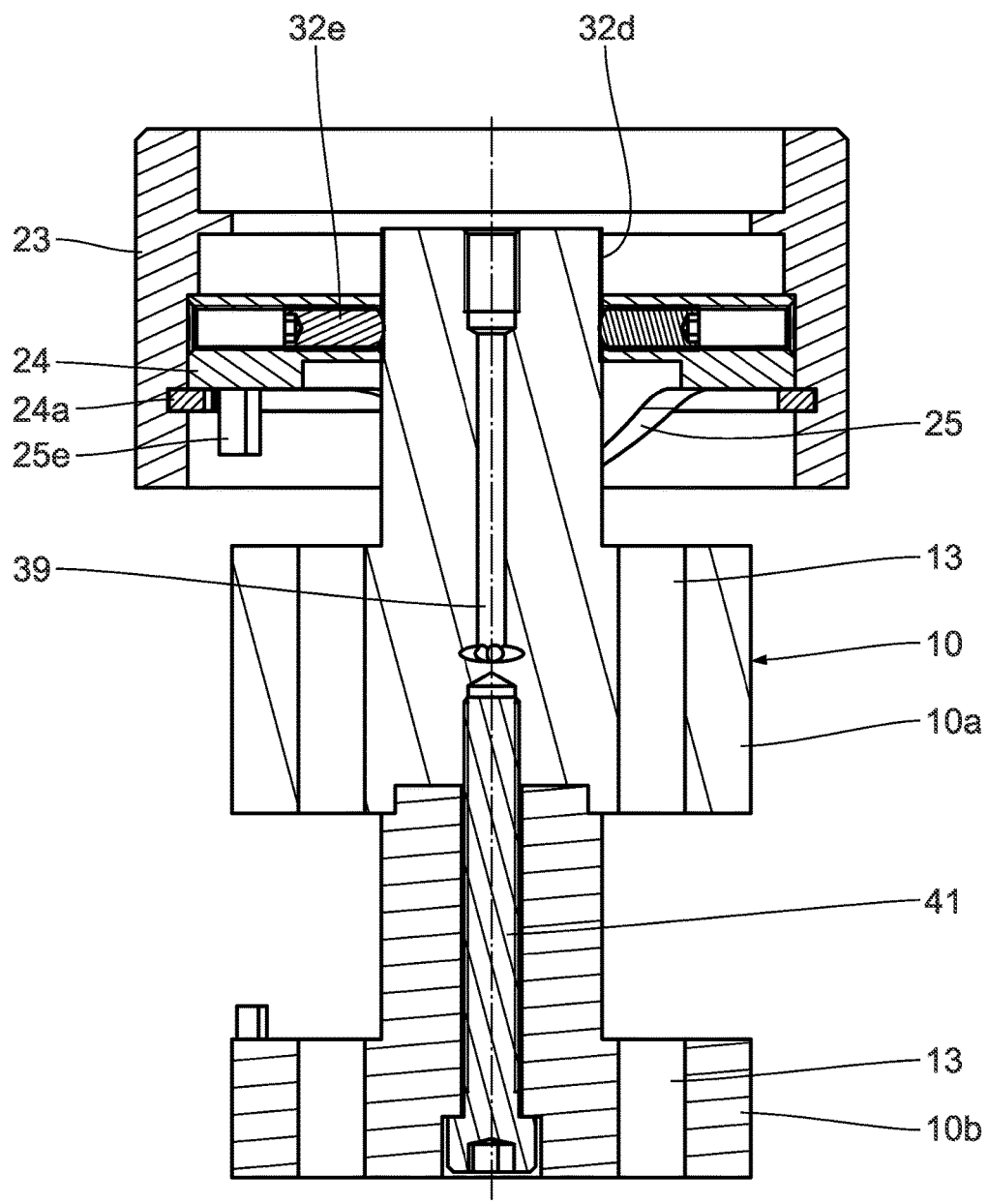
FIG. 11 shows another longitudinal section of a selection of components of the multiple tool along a sectional plane different from that of FIGS. 9 and 10.
Figure 12:
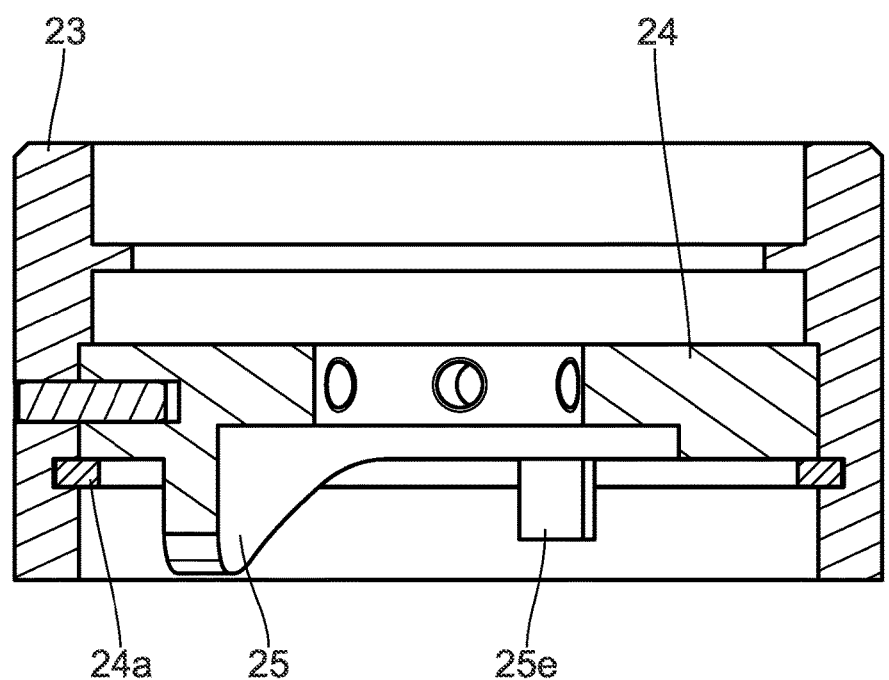
FIG. 12 shows a longitudinal section through a guide device and a selection sleeve of the selection device of the multiple tool.

FIGS. 2 to 12 show a more detailed view of the multiple tool 5 and individual components thereof. The multiple tool 5 has a tool head 9 and a thread cutter magazine 10 arranged therebelow (see for instance FIG. 9). The thread cutter magazine 10 is connected to the tool head 9. The thread cutter magazine 10 is composed of multiple parts. FIG. 11 illustrates a division of the magazine 10 into a head-end magazine part 10a and a workpiece-end magazine part 10b. The thread cutter magazine 10 carries a plurality of thread cutter units 11, namely six thread cutter units 11 in the present case. The entire multiple tool 5 as shown for instance in FIGS. 3 and 4 may be removed from the punching device 1 as a whole. As a result, the components of the multiple tool 5 are easily accessible, for instance in order to change the thread cutter units 11.

Figure 8:
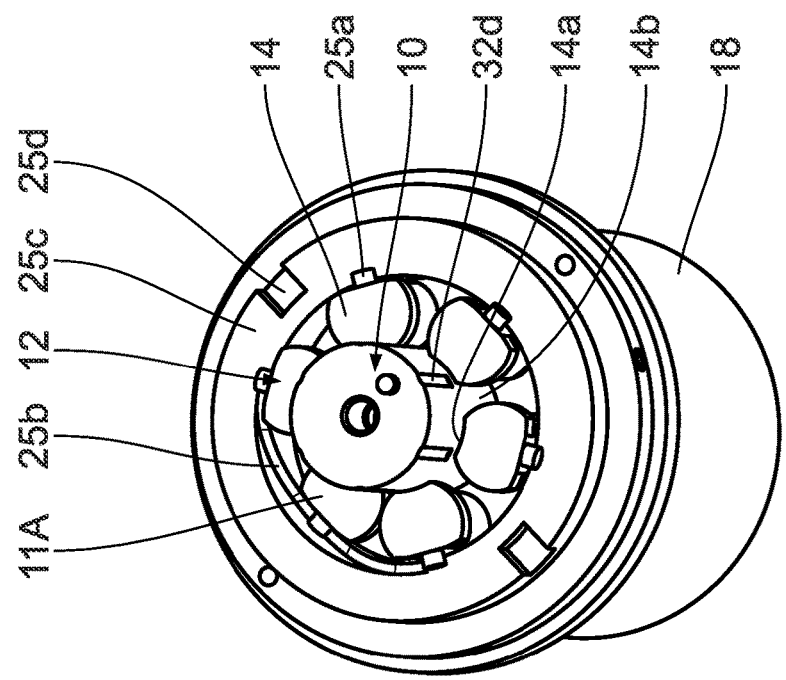
FIGS. 7 and 8 show perspective views of tool-end components of the multiple tool.

Each of the thread cutter units 11 comprises an outer insert sleeve 12, which is axially guided and secured against rotation in a respective insert holder 13 of the thread cutter magazine 10 (see for example FIG. 9). The anti-rotation protection is provided by at least one axial guidance between a sleeve head 14 of the insert sleeve 12 and the insert holder complementary thereto. Said anti-rotation protection is provided by complementary shapes of a radially innermost, concave wall 14*a* of the sleeve head 14 (see FIG. 8), said concave wall 14*a* being complementary to the convex cylindrical outer surface of a head section 14*b* of the head-end magazine part 10*a*.

The thread cutter unit 11 further comprises a thread cutter lead spindle sleeve 15. Said thread cutter lead spindle sleeve 15 has an external thread in a head region, said external thread engaging a complementary internal thread of the insert sleeve 12. Furthermore, the lead spindle sleeve 15 has an external gear 16 in the form of a toothing with axially extending teeth. Said external gear 16 engages an internal gear 17 in the form of a toothing of a drive sleeve 18 of the multiple tool 5. The drive sleeve 18 rotates about a central housing longitudinal axis 19 of the multiple tool 5. The thread cutter units 11 are arranged eccentrically in relation to said housing longitudinal axis 19.

The thread cutter units 11 further include the actual thread cutter or thread former 20 received in the lead spindle sleeve 15. By means of a bias spring 21, which may also be configured as an elastomer body, the respective thread cutter 20 is biased in the associated lead spindle sleeve 15 in the direction of the workpiece, thus allowing compensation for axial forces, which may occur at the start of the cutting process.

A selection device 22 of the multiple tool 5 is provided to select an active thread cutter insert 11A shown on the left-hand side of FIG. 9. Said selection device 22 comprises a selection sleeve 23.

A selection guide device 24 is non-rotationally arranged in the selection sleeve 23. The selection guide device 24 has a selection cam 25 extending downwardly in an approximately sinusoidal curve over about a third of a total circumference of the selection guide device 24 about the housing longitudinal axis 19 (see in particular FIG. 5). The selection guide device 24 interacts with selection pins 25*a* on the sleeve heads 14 of the insert sleeves 12 of the six thread cutter units 11 (see FIGS. 8 and 9). The selection guide device 24 is secured axially to the selection sleeve 23 by means of a retaining ring 24*a* and radially by means of a pin (see for example FIG. 11). The sleeve head 14 of the insert sleeve 12 of the active thread cutter unit 11A abuts against the lowermost point of the selection cam 25 of the selection guide device 24. A selection cam 25*b* of a selection ring 25*c* of the selection device 22 is complementary to the selection cam 25 of the selection guide device 24. The selection cam 25*b* is a counter guide device of the selection guide device 24 of the selection sleeve 23. The selection ring 25*c* is fastened to the selection guide device 24 both axially and in the circumferential direction. For this purpose, the selection ring 25*c* has fixing grooves 25*d* (see FIG. 8), which are engaged by fixing hooks 25*e* (see FIG. 5) of the selection guide device 24.

When selecting the active thread cutter unit 11A, a selection drive body 26 in the form of a drive jacket housing of a selection drive 27 of the punching device 1 is used, said selection drive body 26 being at the same time a thread cutter drive device. The drive jacket housing 26 is driven by a drive device of the punching device 1, the drive device moving the drive jacket housing 26 about the housing longitudinal axis 19. In this process, a drive head 28 of the selection drive body 26 moves into a drive groove 29 provided in a pivotable outer turret sleeve 30 of a station of the punching device 1. The turret sleeve 30 (see FIGS. 2 and 9) is non-rotationally connected to the drive sleeve 18 by means of a tongue-and-groove connection 30*a* (see FIG. 9). In a selection drive configuration or selection position according to FIG. 9, teeth 31 of the magazine 10 are axially moved into coupling receptacles 32 of the drive sleeve 18, the coupling receptacles 32 being complementary to the teeth 31.

In the selection process, a fixing bolt 32*a* of the selection device 22, the fixing bolt 32*a* being actuated by a lifting cylinder 32*b*, which is in turn part of the punching device 1, moves into one of six fixing grooves 32*c*, which are formed in an outer circumferential wall of the selection sleeve 23 at equal distances from each other when seen in the circumferential direction, causing the selection sleeve 23 to be secured against a rotation about the longitudinal axis 19. Next, the selection drive 27 rotates the thread cutter magazine 10 about the housing longitudinal axis 19 by means of the selection drive body 26, the outer housing sleeve 30 and the drive sleeve 18 until the thread cutter unit 11 to be selected reaches the position of the active thread cutter unit 11A. In this position, the active thread cutter unit 11A has been displaced axially downwardly in FIGS. 9 and 10 in relation to the other thread cutter units 11 due to the guiding contact of the sleeve head 14 of the insert sleeve 12 of this active thread cutter unit 11A with the selection cam 25 of the selection guide device 24.

During said displacement of the thread cutter units 11 guided by the selection guide device 24 between the non-active and the active positions, the internal toothings 16 remain actively connected to the external toothing 17. In other words, selection takes place by rotating an outer housing element, namely the turret sleeve 30, in relation to another housing element, namely the selection sleeve 23.

During this selection rotation, the selection sleeve 23 remains stationary, in other words it does not rotate about the housing longitudinal axis 19.

The circumferential extension of the selection cam 25 is adapted to the number of thread cutter units 11 in the multiple tool 5. If for instance eight thread cutter units 11 are provided in another embodiment of the multiple tool 5, the selection cam 25 extends over no more than a quarter of the total circumference of the selection guide device 24.

After selection, the fixing bolt 32*a* is retracted into the lifting cylinder 32*b* and is thus moved out of the fixing groove 32*c*.

If it is not possible to select the desired thread cutter unit 11A in a permissible pivoting range of the drive jacket housing 26, the fixing bolt 32*a* is temporarily retracted into the lifting cylinder 32*b*, and the entire multiple tool 5 is rotated, by means of the drive jacket housing 26, about the housing longitudinal axis 19 until the next fixing groove 32*c* is arranged opposite to the fixing bolt 32*a* in the circumferential direction. Then the fixing bolt 32*c* is able to move into said next fixing groove 32*c*, thus allowing another relative rotation of the selection sleeve 32 in relation to the magazine 10 to take place. If necessary, this process is repeated several times until the desired thread cutter unit 11A has been selected.

If, in the selection process, the entire multiple tool 5 is rotated with the fixing bolt 32*a* being retracted, a rotational position of the selection sleeve 23 in relation to the tool head 9 is fixed by means of ball-ended thrust screws. Grooves 32*d* for these ball-ended thrust screws are formed in the head section 14b of the magazine. The ball-ended thrust screws are shown in FIG. 11 at 32e.

In order to produce a thread, the workpiece 8, which is usually provided with drill holes in advance, is positioned underneath the multiple tool 5 in relation to the active thread cutter unit 11A. Subsequently, in particular the thread cutter 20 of the active thread cutting unit 11A is driven in order to cut or form a thread in the workpiece 8, in other words it is rotated about its respective thread cutter longitudinal axis 33 on the one hand and axially driven to pass through the workpiece 8 on the other.

The thread cutter is driven by a thread cutter drive device, which includes the drive device 27 explained above, by means of the actuating ram 4 of the punching device 1. As soon as the actuating ram 4 displaces the tool head 9 downwardly in relation to the selection sleeve 23 and the selection guide device 24 and counter to the spring bias of the springs 34, which are arranged axially between the tool head 9 and the selection guide device 24 in such a way as to be evenly distributed about the housing longitudinal axis 19 when seen in the circumferential direction, coupling teeth 35 on the lower side of the tool head 9 axially engage complementary coupling recesses 36 in the selection sleeve 23. At the same time, the coupling teeth 31 of the magazine 10 are disengaged from the coupling recesses 32 of the drive sleeve 18 (see FIG. 10). As long as the tool head 9 is not acted upon by the actuating ram 4, the bias springs 34 ensure that the teeth 31 of the magazine 10 move axially into the coupling recesses 32 of the drive sleeve 18 as already explained above.

In order to drive the thread cutter, the drive head 28 of the drive jacket housing 26 comes into engagement with the drive groove 29 again. When the outer housing sleeve 30 is pivoted by the thread cutter drive device, this causes the drive sleeve 18 to be rotated as well; the stationary thread cutter magazine 10, which is non-rotationally connected to the non-rotating tool head during thread cutting, is however not rotated. In other words, the thread cutter drive configuration of the drive device 27 in which the tooth/groove couplings 35, 36 are in engagement while the tooth/groove couplings 31, 32 are disengaged from each other causes the drive sleeve 18 to be pivoted relative to the thread cutter magazine 10 in such a way that the internal gear 17 of the drive sleeve 18 causes a rotation of all lead spindle sleeves 15 of the thread cutter units 11. During rotation, the lead spindle screws 15 rotate relative to the insert sleeves 12, causing the thread cutters 20 to be moved into or out of the workpiece 8 in relation to the insert sleeves 12 depending on the direction of rotation of the pivoting movement of the thread cutter drive device 27. Naturally, this applies only to the active thread cutter unit 11A as the thread cutter 20 thereof is the only part to come into contact with the workpiece. The other thread cutter units 11 are retracted into the housing of the multiple tool 5 to such an extent that they do not come into contact with the workpiece 8 at no time.

When the thread cutter drive device 27 is pivoted, this results in for example four full revolutions in particular of the thread cutter 20 of the active thread cutter unit 11A. Depending on the pivoting angle of the selection drive body 26 about the housing longitudinal axis 19, the number of thread cutter rotations caused thereby may be influenced by the gear ratio of the internal gear 17 relative to the external gears 16. An axial displacement of the thread cutter 20 is for instance 16 mm during thread cutting. The active thread cutter is also referred to as 20A. A gear ratio may for instance be 1:5. As a result, a total of 2.5 revolutions may take place for driving the thread cutter. The axial displacement of the thread cutter 20 during thread cutting depends on the thread to be produced and may for instance amount to 10 mm after 2.5 revolutions when producing an M5 thread having a pitch of 0.8 mm. In an M8 thread having a pitch of 1.25 mm, the associated thread cutter is axially displaced by 15.6 mm when performing the same number of revolutions. The magazine 10 may be provided with thread cutters 20 that differ from each other in size. When using a multiple tool 5 with six thread cutters 20, it is for instance possible to use a metric set of M2.5, M3, M4, M5, M6 and M8 cutters. The multiple tool 5 may also be provided with thread cutters 20 complying with UNF, UNC, BSW, BSF or UNEF thread standards. Providing the multiple tool 5 with a mixture of thread cutters 20 complying with different thread standards is conceivable as well.

The tool head 9 may be provided with a receiving groove 37 at the point of contact of the actuating ram 4 with the tool head 9. As shown in the top view of FIG. 4, said receiving groove 37 has a non-rotationally symmetric edge contour 38, which is in the shape of a keyhole in the embodiment according to FIGS. 2 to 12. A non-rotationally symmetric edge contour 38 of this type may serve as an anti-rotation protection of the tool head 9 relative to the actuating ram 4 about the housing longitudinal axis 19.

During thread cutting, a cutting depth of the active thread cutter unit 11A into the workpiece may be defined by a controlled lowering of the actuating ram 4. The above explanations concerning the axial displacement of the active thread cutter 20A with reference to the different thread sizes apply to the axial displacement of the actuating ram 4 as well. When lowered, the actuating ram 4 lowers the magazine 10 with the thread cutter units 11 including the active thread cutter unit 11A counter to the spring bias of receiving springs 38A in the direction of the workpiece counter holder 7. The receiving springs 38a are arranged axially between the drive sleeve 18 and the turret sleeve 30 in such a way as to be evenly distributed about the housing longitudinal axis 19 when seen in the circumferential direction. The magazine 10 is lowered to a position just above the workpiece, for instance 1 mm above the workpiece.

Lubricating channels 39 pass through in particular the two magazine parts 10a and 10b. Via the lubricating channels 39, lubricant is delivered to the movable parts of the multiple tool 5, in particular to the drive components and the thread cutter units 11. An active lubrication may take place. Via a channel recess 39a in a respective outer wall of the insert sleeve 12, sections of the lubricating channels 39 of the thread cutter unit 11A, which is active at a particular time, may be connected to each other for lubricating in particular the movable parts of the active thread cutter unit 11A. In the non-active, in other words upwardly displaced position of the thread cutter units 11 according to FIGS. 9 and 10, the outer wall of the respective insert sleeve 12 passes through these sections of the lubricating channels 39.

Figure 6:
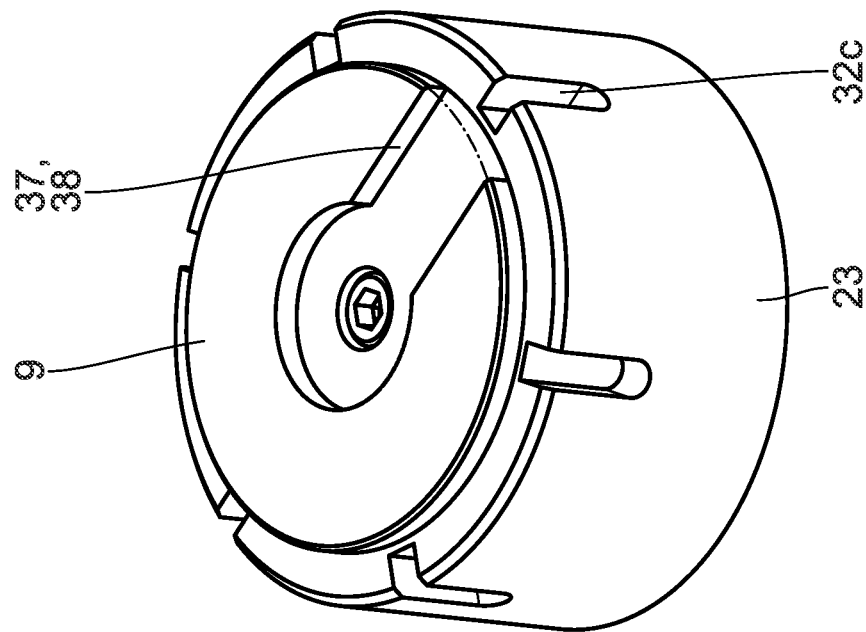
FIGS. 5 and 6 show perspective views of head-end components of the multiple tool.
Figure 5:
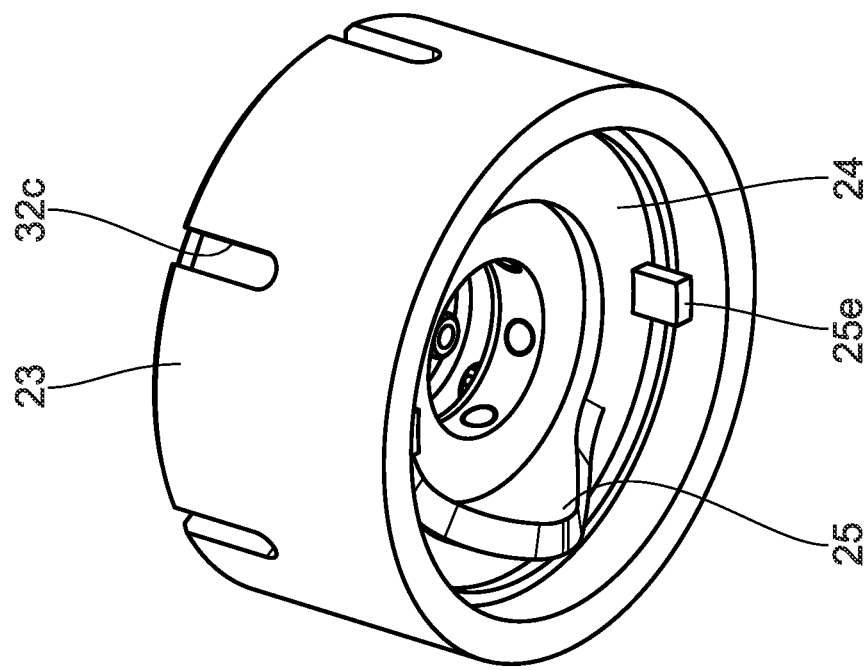
Figure 7:
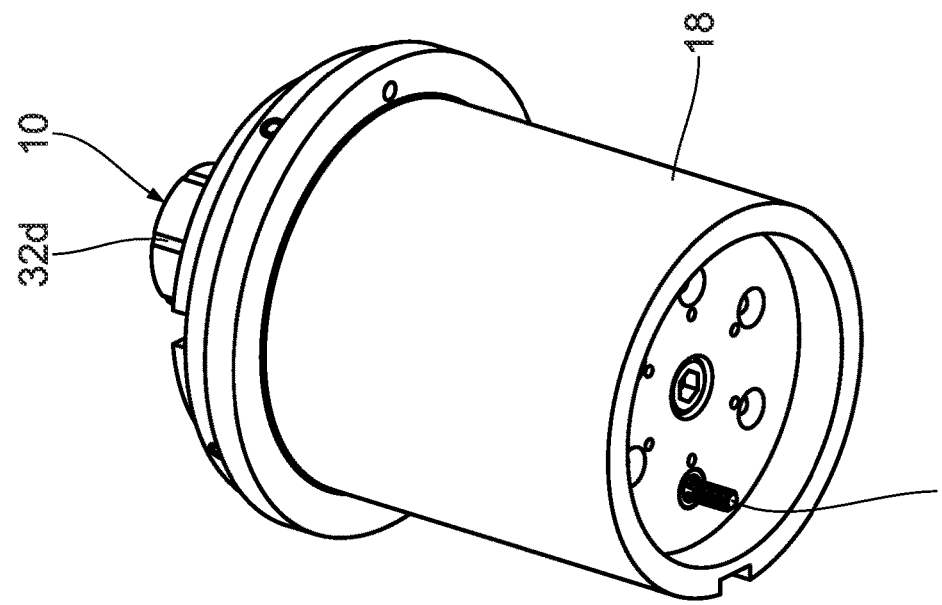

Via central screws 40, 41, the multiple tool 5 can be rapidly disassembled into its subunits, for instance the head-end components according to FIGS. 5 and 6 on the one hand and the tool-end components according to FIGS. 7 and 8 on the other. In particular, the workpiece head 9 is quickly detachable by loosening the screw 40.

Figure 13:
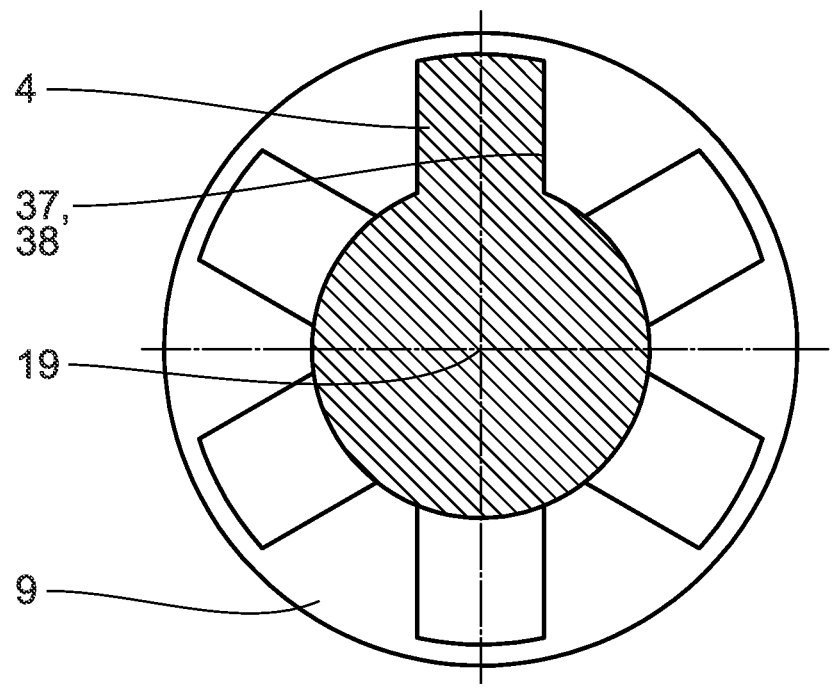
FIG. 13 shows a diagrammatic top view of another embodiment of a tool head of the multiple tool, the Figure also showing an edge contour of an actuating ram of the punching device interacting with said tool head.

In order to position the active thread cutter insert 11A in relation to its place of use on the workpiece, it might be necessary to rotate the entire multiple tool 5 including the tool head 9 about the housing longitudinal axis 19. In an alternative embodiment of the multiple tool 5 shown in FIG. 13, the actuating ram 4 is configured such as to have multiple rotational symmetry, thus allowing the actuating ram 4, the edge contour of which is complementary to the non-rotationally symmetric edge contour 38 of the receiving groove 37, to positively interact with the receiving groove 37 in each of the six possible tool positions when seen in the circumferential direction. Correspondingly, in the embodiment of the multiple tool 5 comprising six thread cutter units 11, the edge contour 38 of the receiving groove 37 has six-fold symmetry.

Figure 14:
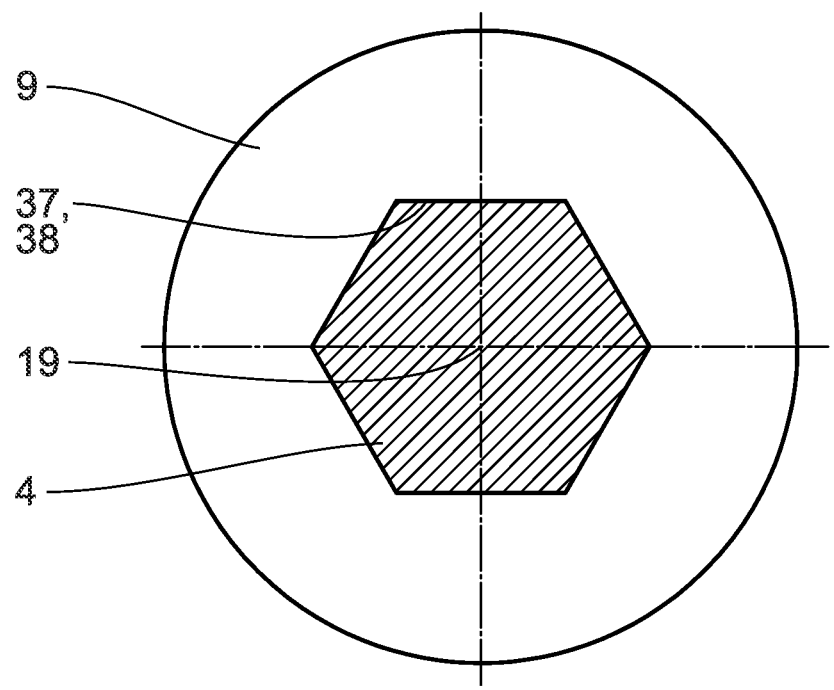
FIG. 14 shows a view, similar to FIG. 13, of another embodiment of a tool head of the multiple tool interacting with another edge contour design of an actuating ram of the punching device.

Another alternative embodiment of a non-rotationally symmetric actuating ram 4 and a complementary receiving groove 37, which is therefore non-rotationally symmetric as well, having an edge contour 38 is shown in FIG. 14. The edge contour has the shape of an equilateral hexagon. In this embodiment, the edge contour 38 of the receiving groove 37 has six-fold rotational symmetry as well, in other words a positive fit between the actuating ram 4 and the receiving groove 37 is possible in any of the six possible selection positions for the active thread cutter unit 11A.

Figure 15:
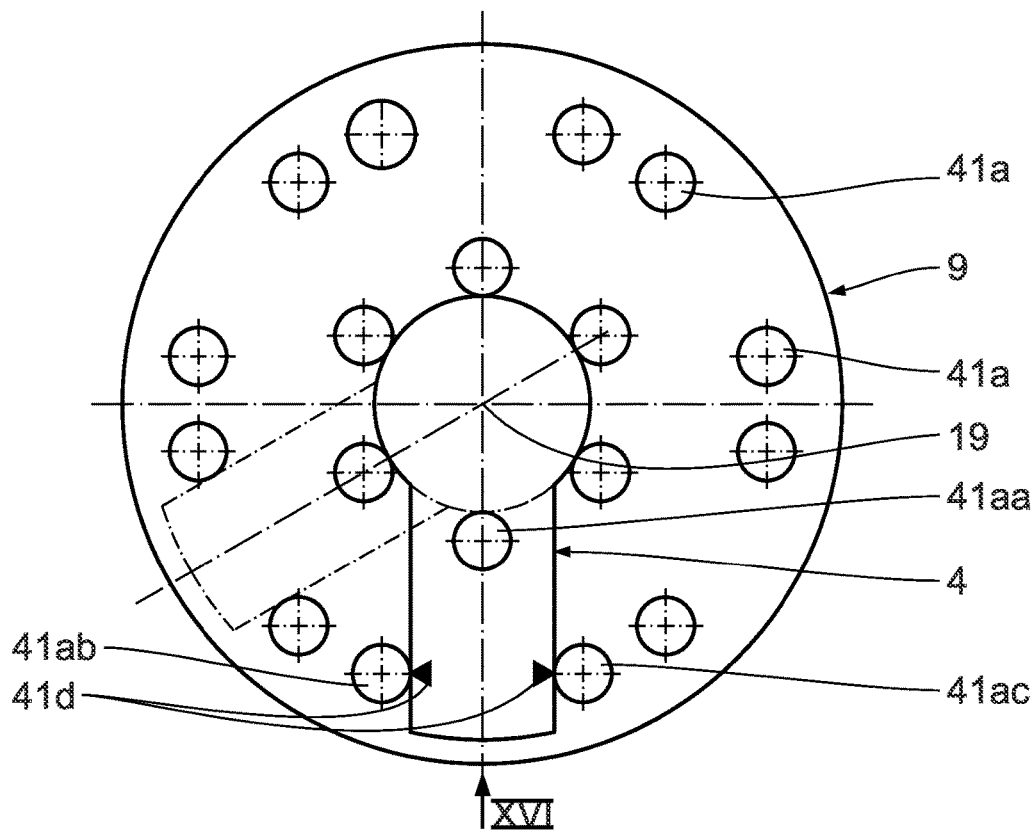
FIG. 15 shows a view, similar to FIGS. 13 and 14, of another embodiment of a tool head of the multiple tool, the Figure also showing an edge contour of the actuating ram of the punching device interacting therewith.
Figure 16:
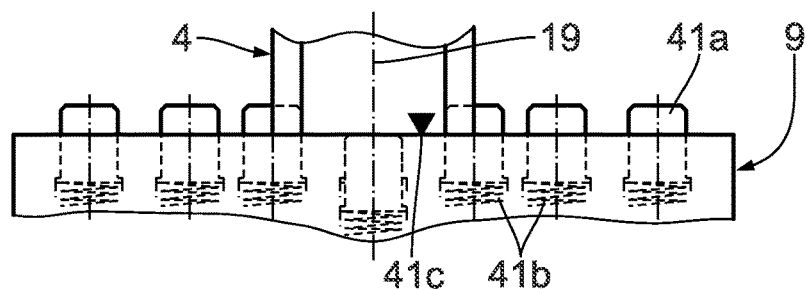
FIG. 16 shows a side view from viewing direction XVI in FIG. 15 with the actuating ram, which is engaged and positively connected to the tool head, with the tool head and the actuating ram each being shown in a broken view.
Figure 17:
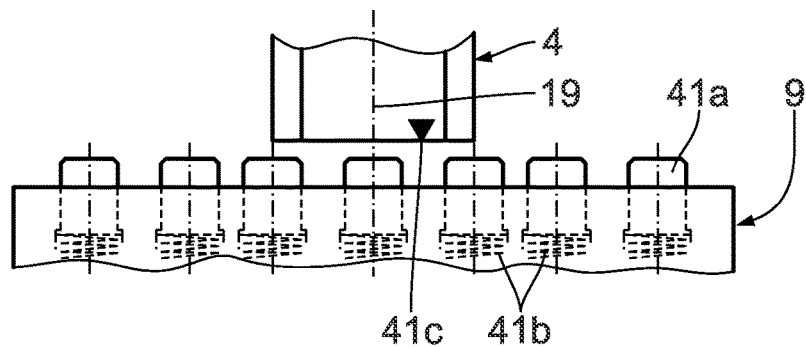
FIG. 17 shows a view, similar to FIG. 16, of the actuating ram in a position moved away from the tool head.

Another alternative design of an upper side of the tool head 9 for interaction with the actuating ram 4 of the embodiment according to FIGS. 2 to 12 is shown in FIGS. 15 to 17. Components and functions corresponding to those already explained above with reference to FIGS. 1 to 14 are designated by the same reference numerals and are not discussed in detail again.

On its upper side facing the actuating ram 4, the tool head 9 according to FIGS. 15 to 17 has a plurality of positive fit bodies 41a in the form of bolts amounting to a total of eighteen in the illustrated embodiment, the bolts being displaceable axially in relation to the remaining tool head 9, in other words in the direction of the housing longitudinal axis 19. By means of respective bias springs 41b, the bolts 41b are biased in the direction of the actuating ram 4, in other words counter to an actuation direction of the actuating ram 4.

The tool head 9 according to FIGS. 15 to 17 is again designed for the embodiment of the multiple tool 5 comprising six thread cutter units 11. Correspondingly, six rotational positions of the tool head about the housing longitudinal axis 19 are possible in the circumferential direction, each of said rotational positions corresponding to a selected thread cutting unit. In each of said six rotational positions, three of the 18 spring bolts 41a designated by 41aa, 41ab and 41ac in FIG. 15 interact with the actuating ram 4 when said actuating ram 4 is in the actuating position (see FIG. 16). An inner one of said three spring bolts, namely the spring bolt 41aa, is displaced by the actuating ram 4 into the tool head 9 counter to the spring bias of the bias spring 41b (see FIGS. 16 and 17). As soon as the actuating ram 4 has come into contact with an upper side of the tool head 9 disposed laterally to said spring bolt 41aa, a pressure sensor 41c disposed in the actuating ram 4 is activated (see FIG. 17). In other words, the upper side of the tool head 9 is a pressure sensor contact surface of the multiple tool 5.

In the actuating position, the actuating ram 4 is disposed precisely between the other two of said three spring bolts interacting with the actuating ram 4 when seen in the circumferential direction, namely between the radially outer spring bolts 41ab, 41ac.

In the region of contact surfaces abutting against side walls of the actuating ram 4 via the lateral surface walls of said two outer spring bolts 41ab, 41ac, the actuating ram 4 is provided with two additional pressure sensors 41d (see FIG. 15). These lateral surfaces of the spring bolts 41ab, 41ac are in turn pressure sensor contact surfaces of the multiple tool 5. If the actuating ram 4 is disposed in the actuating position according to FIG. 16, these two pressure sensors 41d are activated as well. The three pressure sensors 41c, 41d are in signal communication with a central control device (not shown) of the punching device 1.

If all three pressure sensors 41c, 41d respond, the signal "actuating ram positioned correctly" is emitted to the control device.

Three different spring bolts of the 18 spring bolts 41a are active in each of the six relative rotational positions of the actuating ram 4 in relation to the tool head 9. This is shown in FIG. 15 by dashed lines for another relative rotational position.

Furthermore, the pressure sensors 41d are also able to provide a feedback to the punching device 1 concerning the cutting force applied by the multiple tool 5 during thread cutting. During thread cutting, the tool head 9 exerts a force on the actuating ram 4 in the circumferential direction, said force being a measure for the cutting force. If said cutting force is outside a predefined tolerance range, it is possible to emit, via the pressure sensors 41d, a corresponding error message to the control device, which may then for example result in an emergency shutdown of the punching device 1. A warning message indicating that the active thread cutter unit 11A needs to be replaced is conceivable as well.

An alternative embodiment of the multiple tool will hereinafter be explained with reference to FIGS. 18 and 19, said embodiment differing from the embodiment according to FIGS. 1 to 17 in terms of the configuration of a selection drive and a thread cutter drive device.

Figure 18:
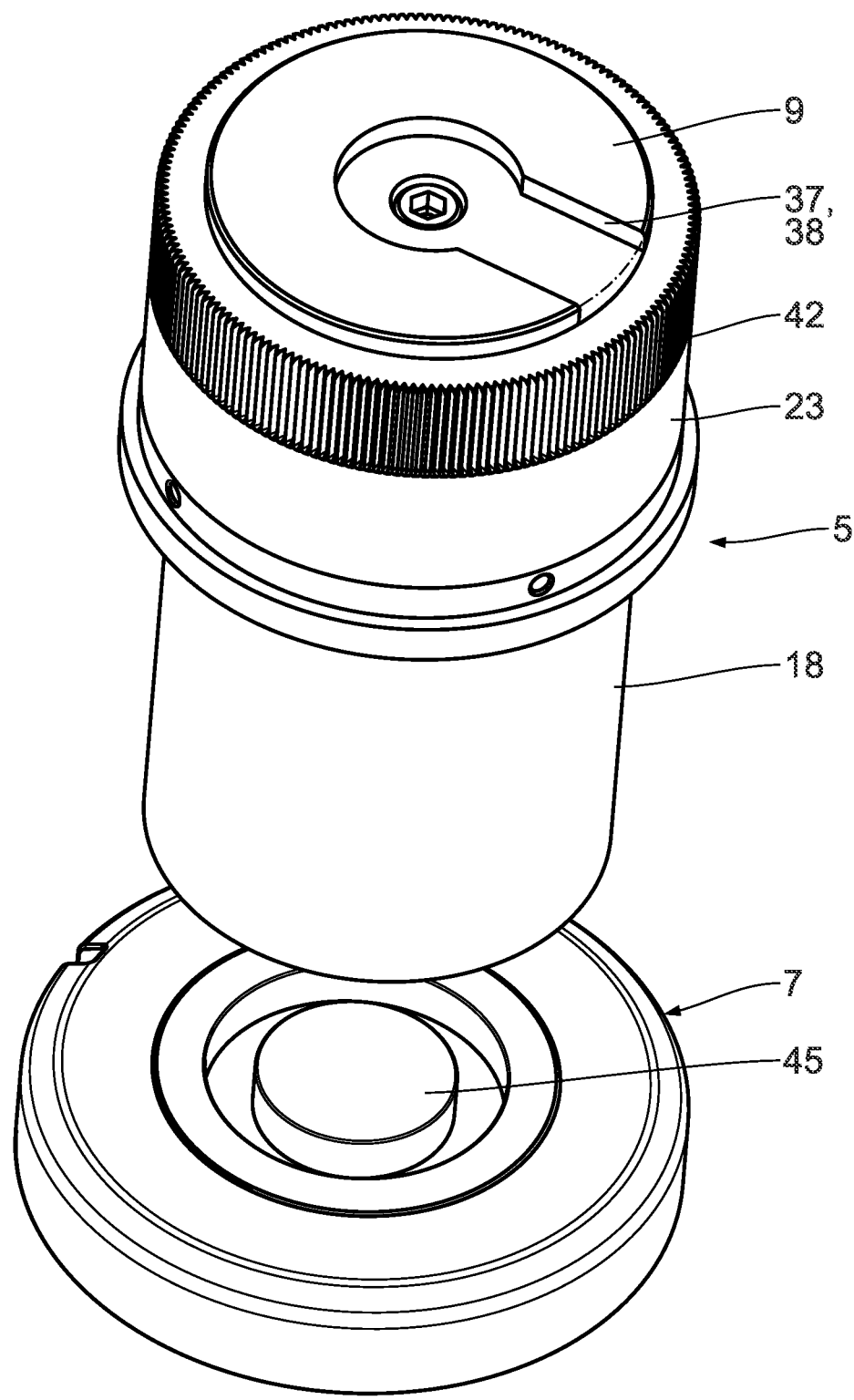
FIG. 18 shows a view, similar to FIG. 4, of another embodiment of a multiple tool and a workpiece counter holder.
Figure 19:
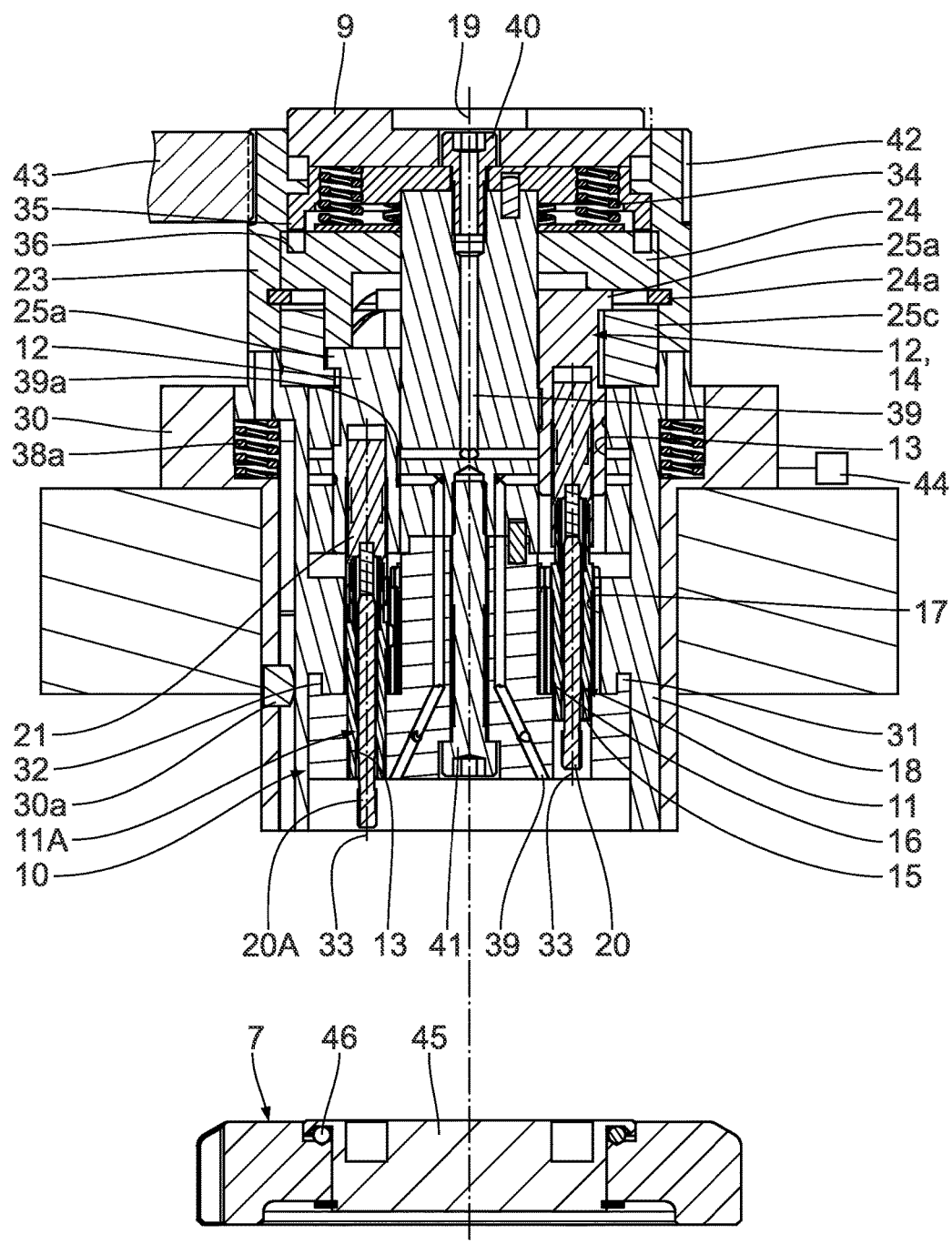
FIG. 19 shows a longitudinal sectional view, similar to FIG. 9, of the multiple tool and the workpiece counter holder according to FIG. 18, with the multiple tool being shown in the selection position for selecting the active thread cutter.

A tooth ring 42 formed in an outer wall of the selection sleeve 23 is part of a selection drive of the embodiment according to FIGS. 18 and 19. A pinion 43 (see FIG. 19) of a selection drive of the punching device 1 is in engagement with said tooth ring 42. The selection drive allows the selection sleeve 23 to be rotated. In the selection position according to FIG. 19, the selection guide device 24 is rotated together with the counter guide device, which is formed by the selection ring 25c, relative to the stationary magazine 10, thus allowing the active thread cutter unit 11A to be selected as already explained above with reference to the embodiment according to FIGS. 2 to 12.

In the thread cutting position, which is not shown for the embodiment according to FIGS. 18 and 19 but generally corresponds to the position according to FIG. 10 of the embodiment explained above, the turret sleeve 30 is rotated by means of a thread cutting drive device 44 shown diagrammatically in FIG. 19.

If the workpiece counter holder 7 is rotated synchronously with the multiple tool 5 during the cutting process performed thereby, the workpiece may be disposed on a center piece 45 of the workpiece counter holder 7, the center piece 45 being mounted on a bearing (see FIG. 19 below). The center piece 45 is mounted for rotation about the housing longitudinal axis 19 relative to the remaining workpiece counter holder 7 by means of a bearing 46. The bearing 46 may be configured as a ball bearing. This alternative embodiment of the workpiece counter holder 7 may be used in all embodiments of the multiple tool 5 described above.

Another embodiment of a multiple tool 47 comprising a plurality of thread cutters and an associated workpiece counter holder 7 will hereinafter be described with reference to FIGS. 20 to 25. Components and functions explained above with reference to the embodiments according to FIGS. 1 to 19 are designated by the same reference numerals and are not discussed in detail again.

Figure 20:
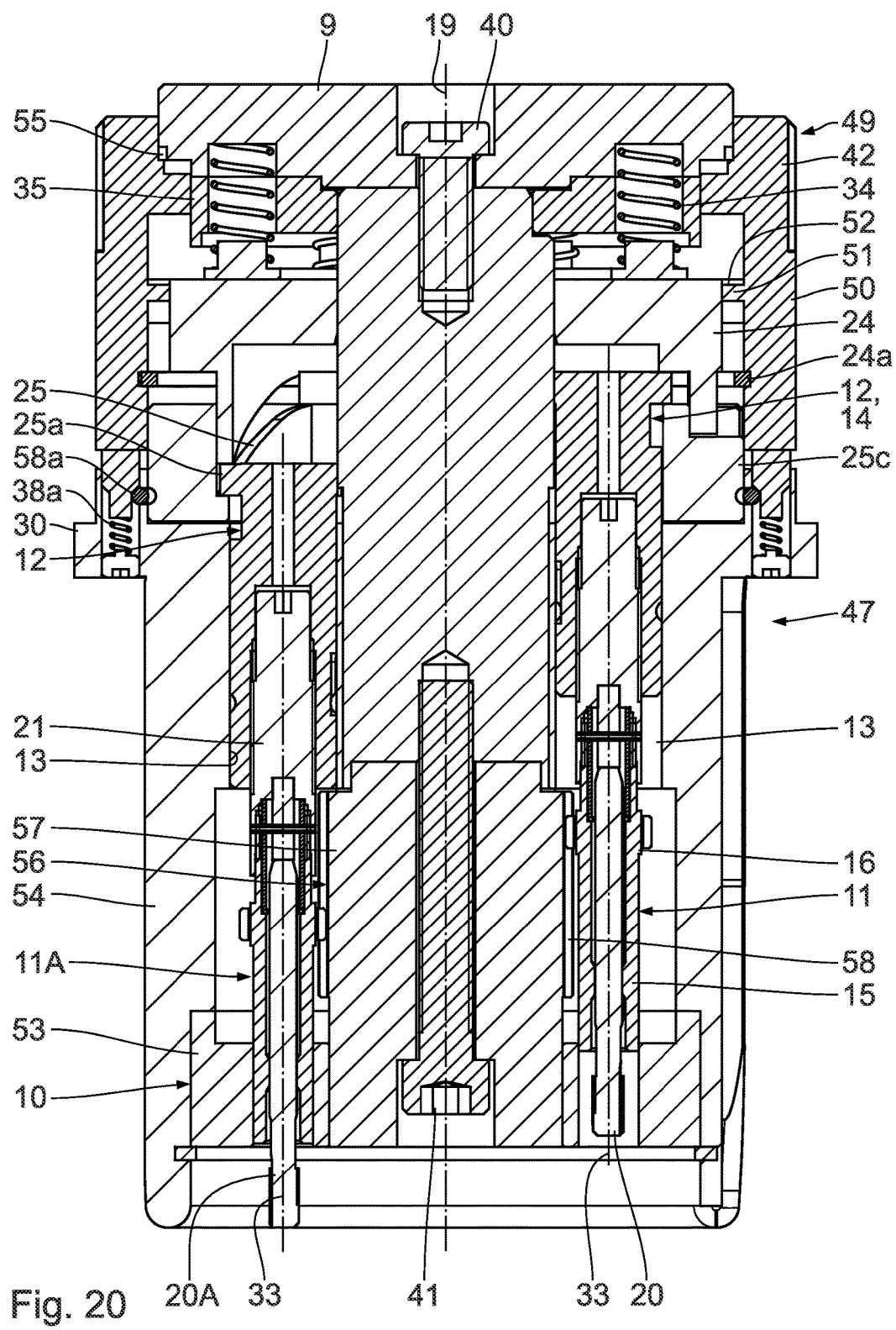
FIG. 20 shows a longitudinal sectional view, similar to FIG. 9, of another embodiment of a multiple tool shown in a selection position for driven selection of an active thread cutter.
Figure 21:
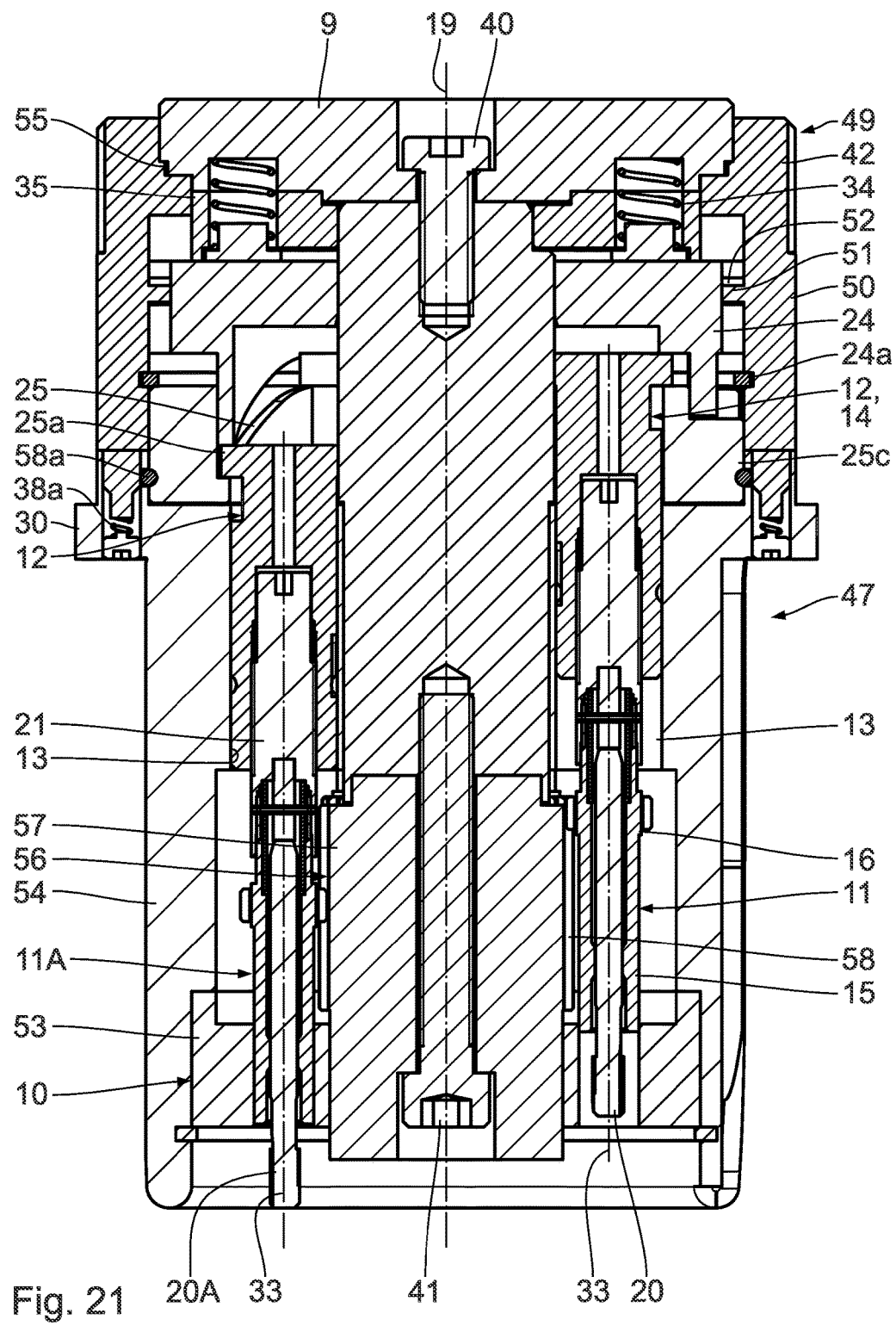
FIG. 21 shows the multiple tool according to FIG. 20, the multiple tool being shown in a drive position for the driving the active thread cutter via a tool drive device.
Figure 22:
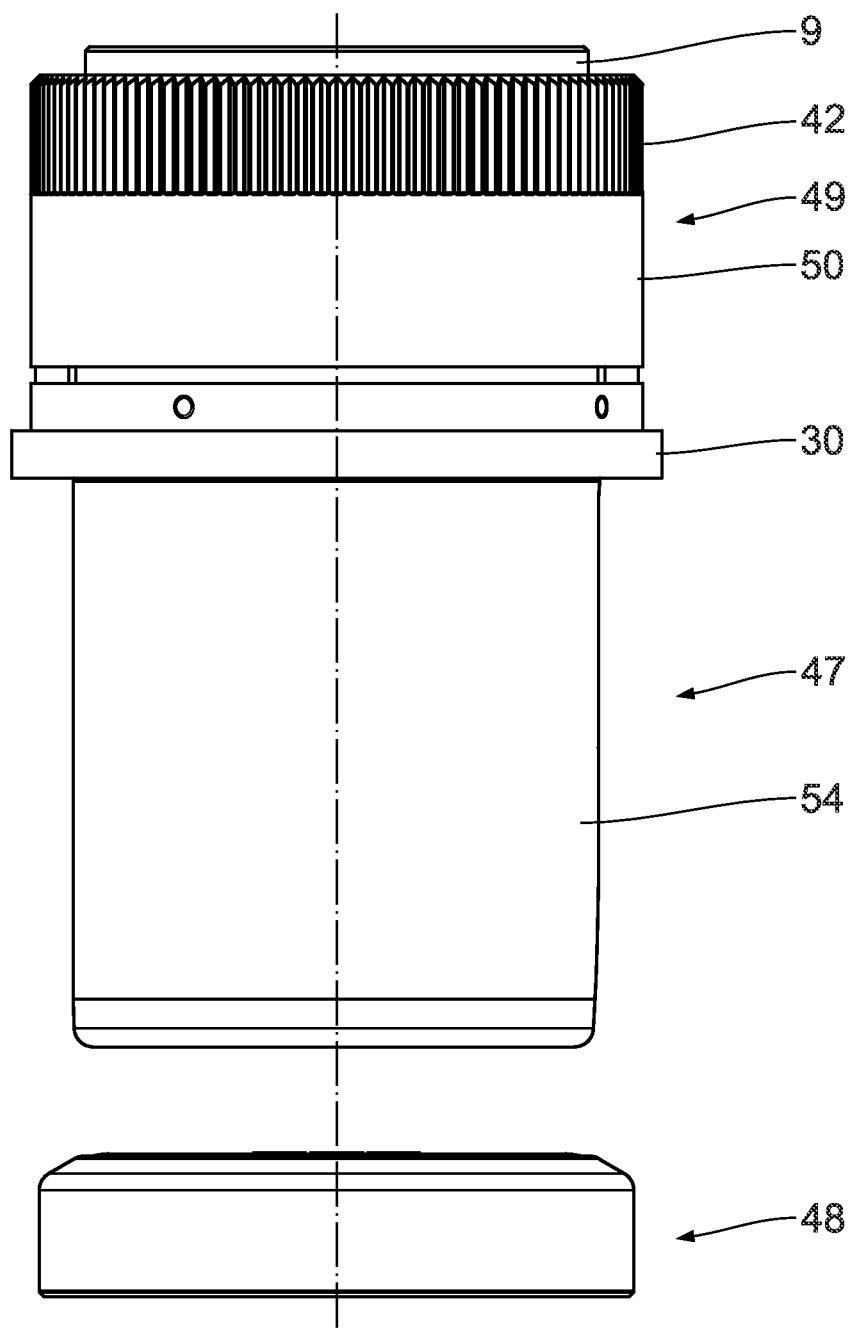
FIG. 22 shows a side view of the multiple tool according to FIG. 20 and of an associated workpiece counter holder.

FIG. 20 shows the multiple tool 47 in a selection position of the head-end components in which it is possible to select the active thread cutter 11A from the thread cutters 11 of the multiple tool 47 by means of a tool selection device 49. FIG. 21 shows the multiple tool 47 in a drive position in which the active thread cutter is drivable by means of a tool drive device, which—in the multiple tool 47—is at the same time a selection drive of the tool selection device 49.

In the selection position according to FIG. 20, a head-end tooth ring housing sleeve 50 interacts with a selection pinion (not shown) of the selection drive. Coupling teeth 51 extend radially inwardly from the tooth ring housing sleeve 50. In the selection position according to FIG. 20, the coupling teeth 51 non-rotationally interact with coupling receptacles 52 of the selection guide device 24 for rotation about the housing longitudinal axis 19.

The selection guide device 24 is in turn non-rotationally connected to the selection ring 25c. Between these two components having complementary arcuate shapes when seen in the circumferential direction about the housing longitudinal axis 19, the selection pints 25a of the thread cutter units 11 are disposed.

In the multiple tool 47, lower guide sleeves 53 for the thread cutter units 11 are fixedly mounted to an outer housing sleeve 54 receiving the thread cutter magazine 10. Said housing sleeve 54 is a stationary, in other words non-driven, receptacle of the thread cutter magazine 10.

During selection, in other words when actuating the selection device 49, the tooth ring housing sleeve 50 and the selection guide device 24 rotate about the housing longitudinal axis 19 together with the selection ring 25c.

The thread cutter magazine 10 remains stationary. The active thread cutter 11A is then selected by means of the selection cam 25 which rotates during selection; depending on the rotation of the selection cam 25, the thread cutters 11 are lifted or lowered only in the axial direction but remain stationary in their circumferential position about the housing longitudinal axis 19. As soon as the desired thread cutter 11A has been selected, the selection drive stops.

FIG. 21 shows the multiple tool 47 in the drive position. In this position, the tool head 9 has been displaced axially by a ram of the turret press in such a way that a non-rotational connection is produced between the tooth ring housing sleeve 50 and the tool head 9 via a coupling tooth/coupling receptacle connection 55. Via the screw 40, the tool head 9 is in turn non-rotationally connected to a drive core or drive shaft 56. The drive core 56 passes centrally through the multiple tool 47. A lower core section 57 of the drive core 56 facing away from the tool head 9 has an outer tooth ring section 58 which is part of the thread cutter drive device 27 of the multiple tool 47 and the function of which corresponds to that of the internal gear 17 of the multiple tool 5 described above. The tooth ring section 58 in turn engages the external gear 16 of the thread cutter units 11. In other words, when the tooth ring housing sleeve 50 is rotated, this causes the thread cutters 11, and in particular the active thread cutter 11A, to be driven in the drive position according to FIG. 21.

In the drive position, the coupling teeth 51 of the tooth ring housing sleeve 50 are displaced to such an extent that they are disengaged from the coupling receptacles 52 of the selection guide device 24. As a result, the selection guide device 24 does not rotate when the tooth ring housing sleeve 50 is rotated in the drive position.

In addition thereto, the multiple tool 47 is provided with another coupling 58a between the tooth ring housing sleeve 50 and the selection ring 25c. The coupling 58a is disengaged in the selection position according to FIG. 20 and engaged in the drive position according to FIG. 21. A coupling ring of the coupling 58a, which is a non-rotational coupling component thereof, is in frictional contact with the selection ring 25c in the engaged position, thus preventing an unwanted rotation of the selection guide device 24 in the drive position when the tooth ring housing sleeve 50 is rotated.

Figure 24:
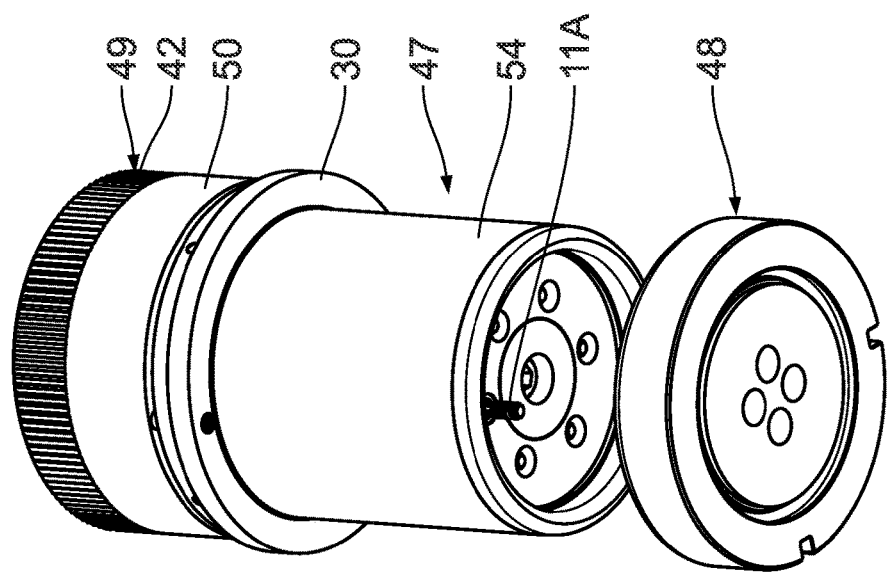
FIGS. 23 and 24 show perspective views of the multiple tool and of the workpiece counter holder according to FIG. 22.
Figure 23:
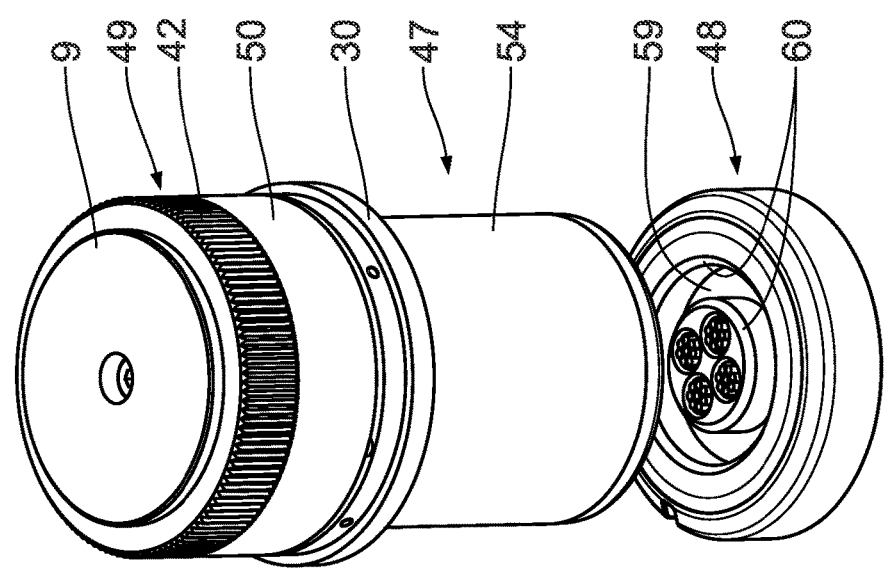
Figure 25:
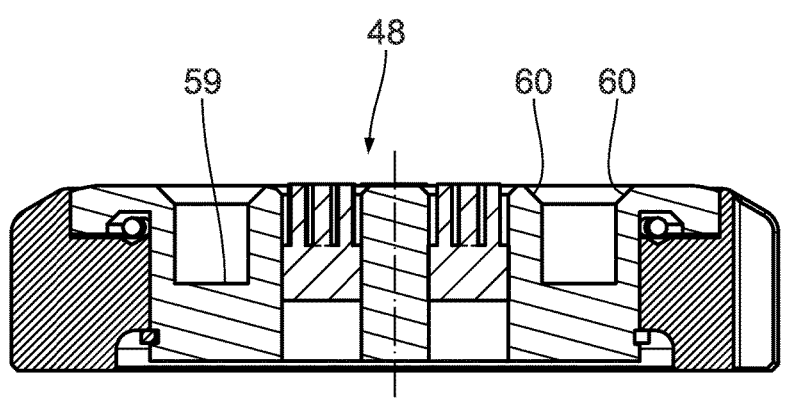
FIG. 25 shows a longitudinal section through the workpiece counter holder according to FIGS. 22 to 24.

FIGS. 23 to 25 show details of the workpiece counter holder 48. Similar to the workpiece counter holder 7, said workpiece counter holder 48 has an annular recess 59 allowing the active thread cutter 11A to pass into during thread cutting after passing through the workpiece, thus preventing direct contact with the workpiece counter holder 48.

The support face of said annular recess, in other words the face of the workpiece counter holder 48 facing multiple tool 47, is provided with circumferential chamfers 60.

Another embodiment of a multiple tool 47, which may be used instead of the multiple tool 47 according to FIGS. 20 to 25, will hereinafter be described with reference to FIGS. 26 to 29.

The multiple tool 47 according to FIGS. 26 to 29 differs from that according to FIGS. 20 to 25 only in terms of the design of a force-transmitting housing sleeve 61, which is used instead of the tooth ring housing sleeve 50. Instead of a tooth ring, said force-transmitting housing sleeve 61 is provided with gear grooves 62 on its head which may be engaged by corresponding drive teeth of a selection drive or thread cutting drive.

Sheet metal geometries allowing threads to be produced using the multiple tools described above will hereinafter be explained with reference to FIGS. 30 to 32.

Figure 30:
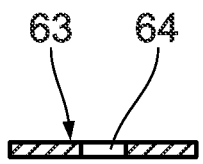
FIGS. 30 to 32 each show cross-sections of workpieces in the region of a threaded hole prepared for the use of the thread cutter.

FIG. 30 shows a section of a workpiece 63 showing the region surrounding a threaded hole 64. During thread forming, said threaded hole 64 is engaged by the forming section of the active thread cutters 11A.

Figure 31:
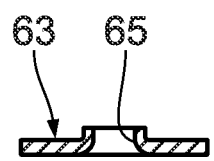
Figure 32:
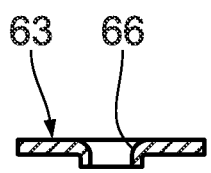

FIG. 31 shows a variation of a threaded hole in the form of an extruded hole 65 the collar of which faces the workpiece counter holder 48.

After forming a thread in the threaded hole 66, the chamfers 60 in the workpiece counter holder 48 allow the workpiece 63 to be displaced laterally in relation to the workpiece counter holder 48, with the collar of the extruded hole 66 facing the counter holder 48 sliding on the respective chamfer 60 like on a ramp.

Figure 26:
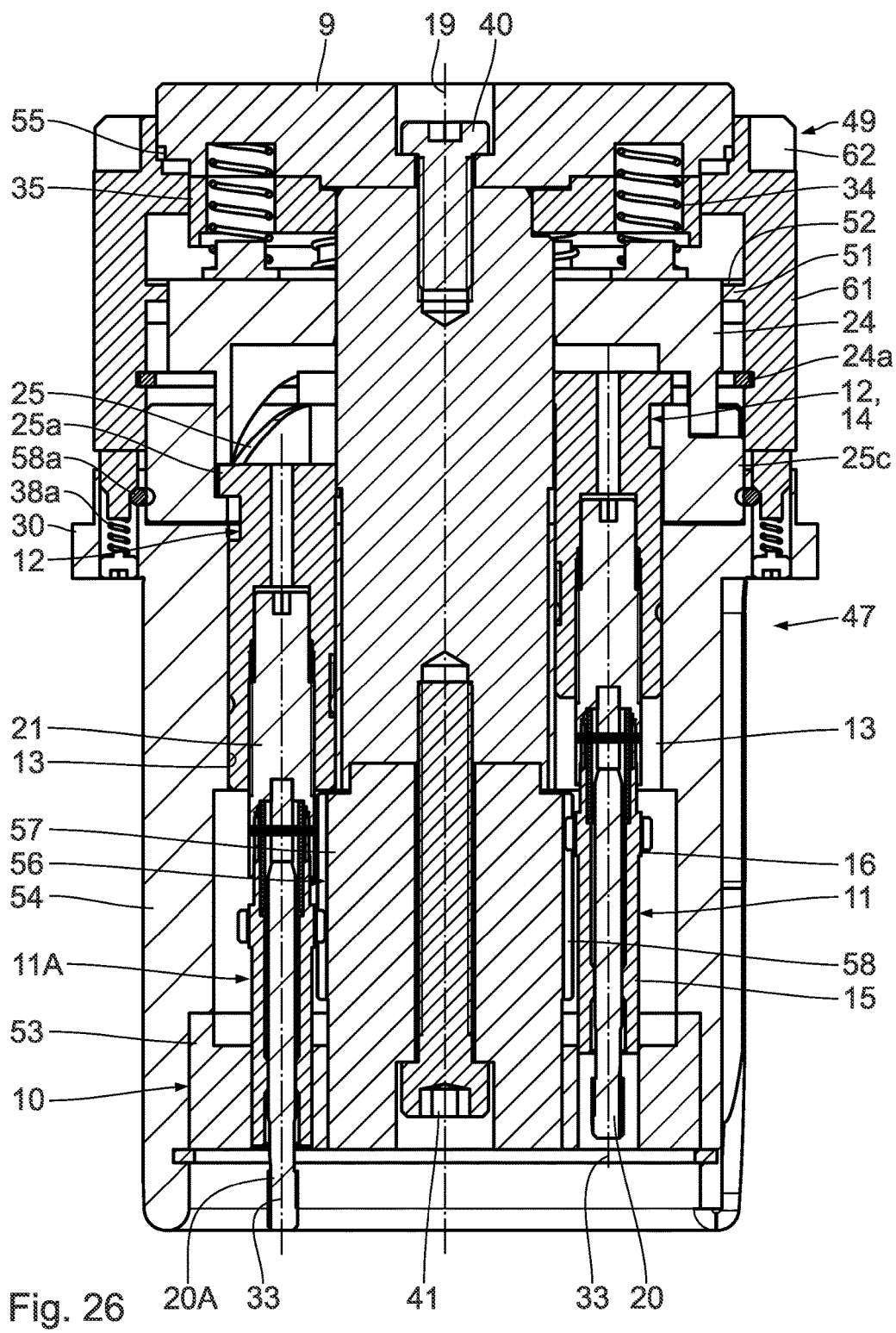
FIG. 26 shows a view, similar to FIG. 20, of another embodiment of a multiple tool.
Figure 27:
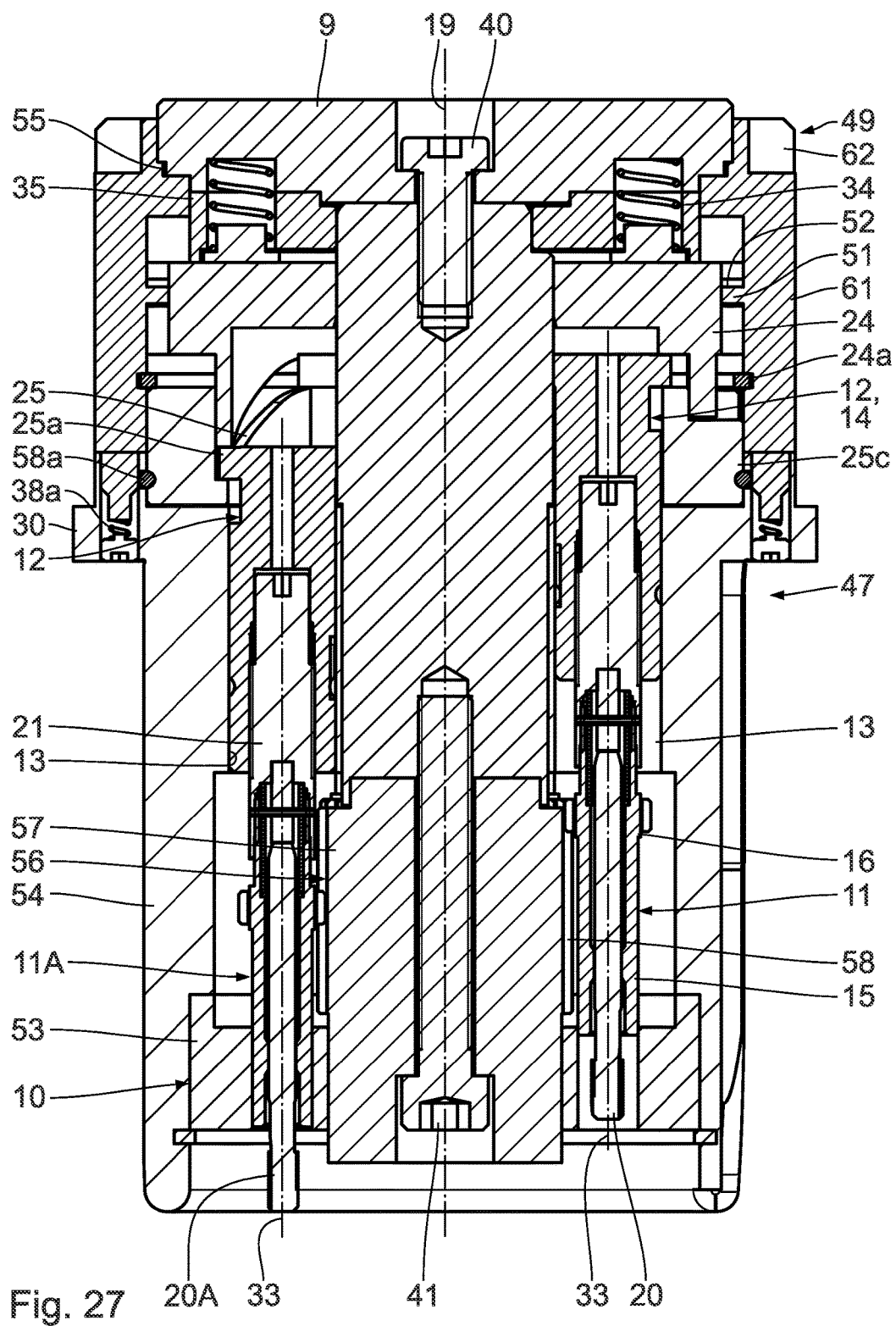
FIG. 27 shows a view, similar to FIG. 21, of the multiple tool according to FIG. 26.
Figure 29:
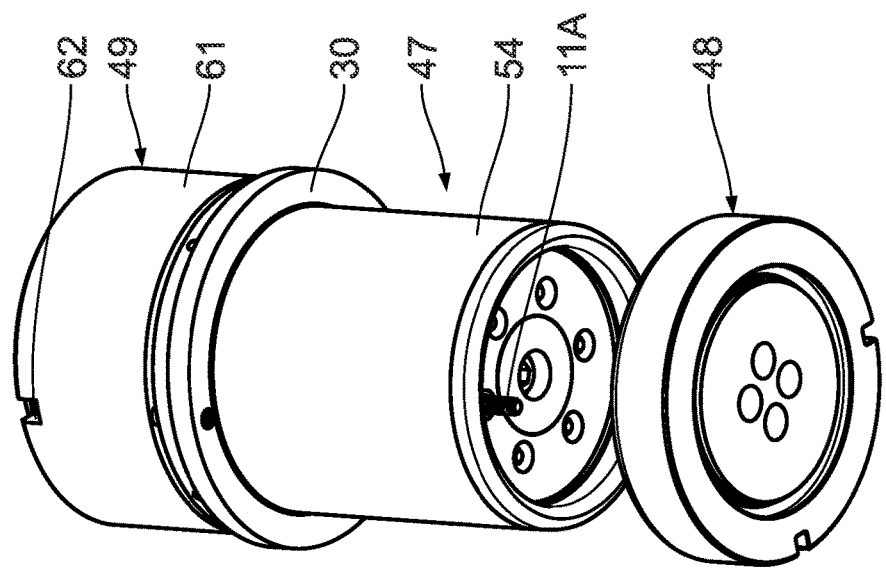
FIGS. 28 and 29 show views, similar to FIGS. 23 and 24, of the multiple tool according to FIG. 26 and of an associated workpiece counter holder.
Figure 28:
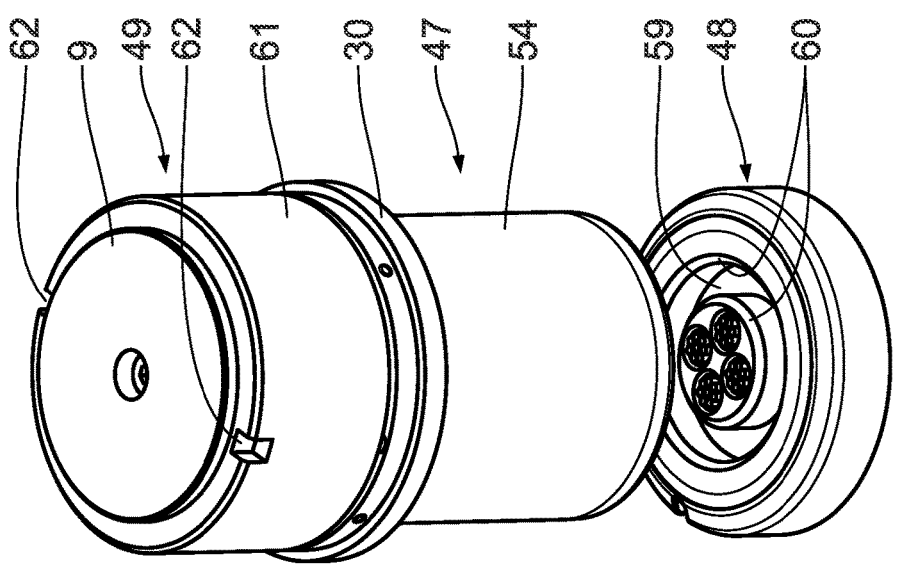

Another embodiment of a thread cutter unit 11, which may be used in the embodiments of the multiple tools 5, 47 according to FIGS. 9, 20 and 26 instead of the thread cutter units described above, will hereinafter be explained with reference to FIGS. 33 to 35. Components and functions corresponding to those already explained above with reference to FIGS. 1 to 32 are designated by the same reference numerals and are not explained in detail again.

In the thread cutter unit 11 according to FIG. 33, the pin-shaped thread cutter 20 used to form the thread in the workpiece, is connected to the thread cutter lead spindle sleeve 15 in a way that differs from the way the thread cutters 20 of the embodiments of thread cutter units 11 described above are connected thereto. In these embodiments described above, the thread cutters 20 are fastened in the thread cutter lead spindle screw 15 by means of a locking ring.

Figure 35:
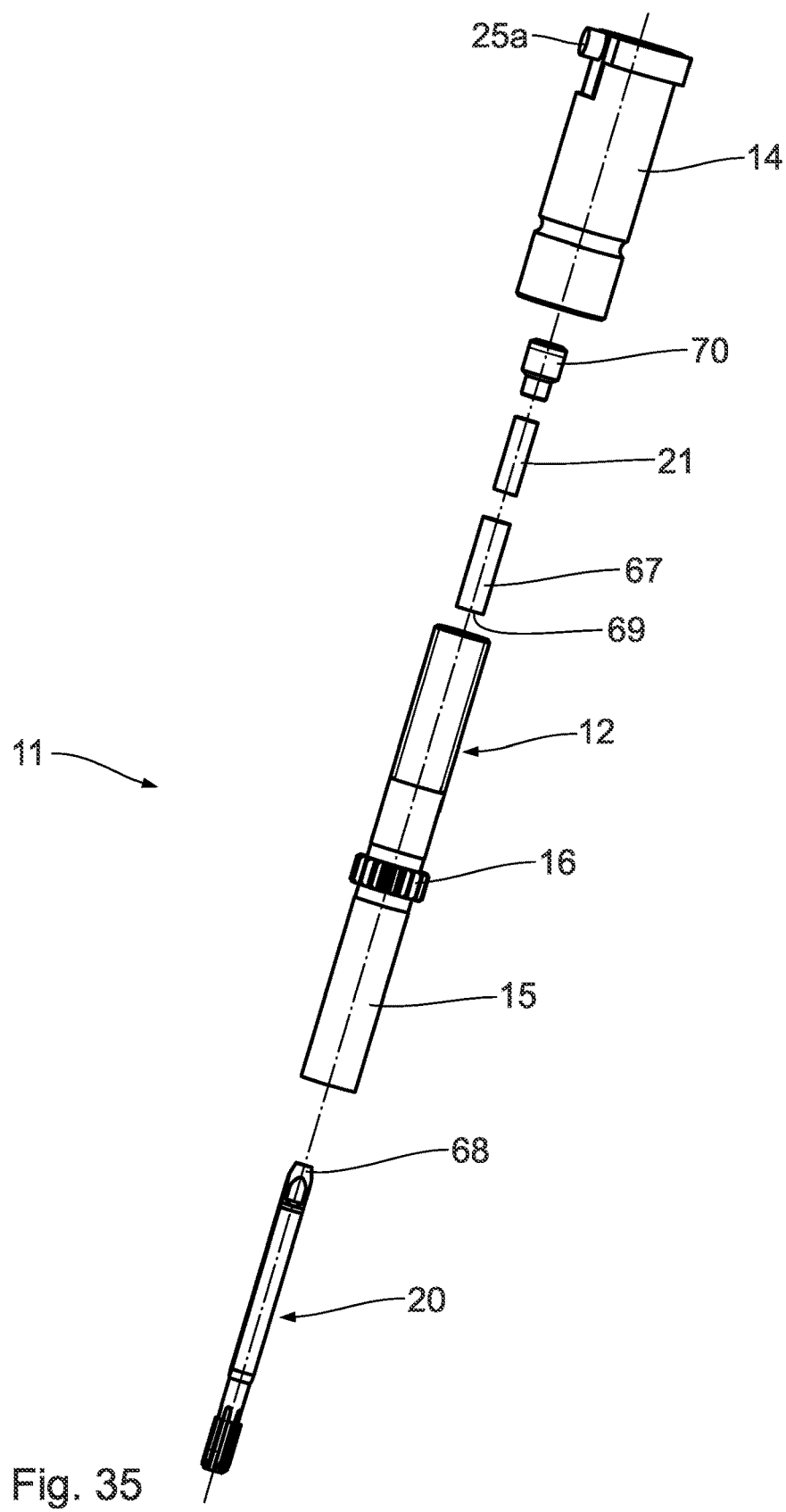
FIG. 35 shows an exploded view of the thread cutter unit according to FIG. 33.

In the embodiment according to FIGS. 33 to 35, the thread cutter 20 is fastened axially in the thread cutter lead spindle screw 15 by means of a permanent magnet 67. A thread cutter head 68 of the thread cutter 20 abuts against the front end of an end face 69 of the permanent magnet 67 facing said thread cutter head 68. The thread cutter 20 tapers in the region of the thread cutter head 68, in other words it does not have the same but a reduced cross-section in the region of contact with the permanent magnet end face 69 as in the remaining lead spindle sleeve 15.

In the position shown in FIG. 33, the permanent magnet end face 69 is biased by the bias spring 21 in the form of a cylindrical PU elastomer block. In this position, the permanent magnet end face 69 is supported against a circumferential step 69*a* of the lead spindle sleeve 15 counter to the bias of the bias spring 21.

By means of a clamping screw 70 screwed into the head end of the lead spindle sleeve 15, the bias spring 21 is biased against the permanent magnet 67. The bias spring 21 is then disposed between a front end of the clamping screw 70 and another end face of the permanent magnet 64 facing said front end.

A screw head of the clamping screw 70 is accessible from above via a channel 71 extending through the sleeve head 14.

The pin-shaped thread cutter 20 is non-rotationally connected to the lead spindle sleeve 15, and therefore to the entire insert sleeve 12.

If the thread cutter unit 11 according to FIGS. 33 to 35 is selected for forming a thread in a workpiece, the bias spring 21 provides a spring force in the axial direction, thus ensuring an equalized thread forming process.

When machining uneven workpieces, an axial force may occur during thread forming, said axial force acting on the thread cutter in a downward direction according to FIG. 33. If this axial force exceeds a threshold force definable via the magnetic force of the permanent magnet 67, the thread cutter 20 detaches from the end face 69, thus preventing damages to the active thread cutter unit 11A caused by an excess force of this type. As soon as the thread cutter 20 is released from the workpiece after having detached from the permanent magnet or the threshold force falls below the threshold value again, the permanent magnet 67 attracts the thread cutter head 68 again, thus ensuring that the thread cutter head 68 is axially secured to the permanent magnet end face 69 again.

The invention claimed is:

1. A multiple tool for a punching device comprising:
   a housing,
   a tool head interacting with the punching device,
   a thread cutter magazine comprising a plurality of thread cutters, the thread cutter magazine being connected to the tool head,
   a selection device for selecting an active thread cutter which interacts with a workpiece for thread cutting, and
   a thread cutter drive device for driving the active thread cutter,
   wherein the selection device has a guide device and a counter guide device for displacing the active thread cutter axially relative to the other thread cutters in the direction towards the workpiece,
   wherein the guide device has a first selection cam extending downwardly and the counter guide device has a second selection cam, which is complementary to the first selection cam, and
   wherein the thread cutters are guided between the first selection cam and the second selection cam.

2. The multiple tool according to claim 1, configured to be use for a turret punch press.

3. The multiple tool according to claim 1, wherein the selection device is configured in such a way that a selection takes place by rotating an outer housing element in relation to another housing element.

4. The multiple tool according to claim 1, wherein the selection device is configured in such a way that a selection takes place by means of a selection drive.

5. The multiple tool according to claim 3, wherein the thread cutter drive device is at the same time the selection drive.

6. The multiple tool according to claim 1, wherein the drive device has a rotating component comprising a toothing which is actively connected to a thread cutting drive, the toothing interacting with an external toothing of the thread cutter.

7. The multiple tool according to claim 5, comprising a configuration of the drive device such that the toothing is actively connected to the external toothing both in an active position of the thread cutter that is active at that time and in a non-active position of the thread cutter that is non-active at that time.

8. The multiple tool according to claim 1, wherein on its upper side facing an actuating ram, the tool head has a plurality of positive fit bodies displaceable in an actuating direction, the positive fit bodies being arranged and configured in such a way as to ensure a positive fit between the tool head and the actuating ram in an actuating position of the actuating ram.

9. The multiple tool according to claim 7, wherein the positive fit bodies are configured as bolts which are resiliently biased counter to an actuating direction of the actuating ram, with at least one of the bolts being displaced counter to its bias in the actuating position of the actuating ram.

10. The multiple tool according to claim 1, wherein the tool head has at least one pressure sensor contact surface for interaction with a pressure sensor of the actuating ram.

11. A multiple tool for a punching device, comprising:
   a housing,
   a tool head interacting with the punching device,
   a thread cutter magazine comprising a plurality of thread cutter units, the thread cutter magazine being connected to the tool head, and the thread cutter units each having a pin-shaped thread cutter for thread forming and a rotatably drivable insert sleeve, with which the thread cutter is non-rotatably connected,
   a selection device for selecting an active thread cutter which interacts with a workpiece for thread cutting, and
   a thread cutter drive device for driving the active thread cutter,
   wherein the thread cutter drive device has a rotating component comprising a toothing which is actively connected to a thread cutting drive, the toothing interacting with an external toothing of the thread cutter,
   wherein a configuration of the drive device is such that the toothing is actively connected to the external toothing both in an active position of the thread cutter that is active at that time and in a non-active position of the thread cutter that is nonactive at that time,
   wherein each thread cutter unit comprises exactly one bias spring for mounting the thread cutter in the insert sleeve in an axially resilient manner,
   wherein the thread cutter is held in the insert sleeve by a magnet, and
   wherein the magnet is selected such that the thread cutter detaches from the insert sleeve when a predefined threshold force is exceeded to prevent damages to the thread cutter, wherein the selection device has a guide device and a counter guide device for displacing the active thread cutter axially relative to the other thread cutters in the direction towards the workpiece, wherein the guide device has a first selection cam extending downwardly and the counter guide device has a second selection cam, which is complementary to the first selection cam, and wherein the thread cutters are guided between the first selection cam and the second selection cam.

12. The multiple tool according to claim 11, configured to be used for a turret punch press.

\* \* \* \* \*